US008370834B2

(12) United States Patent
Edwards et al.

(10) Patent No.: US 8,370,834 B2
(45) Date of Patent: Feb. 5, 2013

(54) ROUTING ACROSS A VIRTUAL NETWORK

(75) Inventors: Aled Edwards, Charfield (GB); Anna Fischer, Bristol (GB); Chris I Dalton, Bristol (GB); Patrick Goldsack, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 852 days.

(21) Appl. No.: 12/400,491

(22) Filed: Mar. 9, 2009

(65) Prior Publication Data
US 2010/0107162 A1 Apr. 29, 2010

(30) Foreign Application Priority Data

Mar. 7, 2008 (GB) .................................. 0804253.3

(51) Int. Cl.
*G06F 9/455* (2006.01)
*G06F 15/173* (2006.01)
(52) U.S. Cl. .............................. 718/1; 709/238; 709/239
(58) Field of Classification Search .................. None
See application file for complete search history.

(56) References Cited

U.S. PATENT DOCUMENTS

| 2004/0267866 A1* | 12/2004 | Carollo et al. ................. 709/200 |
| 2005/0182853 A1* | 8/2005 | Lewites et al. ................. 709/238 |
| 2007/0058638 A1* | 3/2007 | Guichard et al. ......... 370/395.31 |

FOREIGN PATENT DOCUMENTS

| GB | 2418326 A | 3/2006 |
| WO | WO 95/01023 | 1/1995 |
| WO | WO 02/19056 A2 | 3/2002 |

* cited by examiner

*Primary Examiner* — Eddie P Chan
*Assistant Examiner* — William B Partridge

(57) ABSTRACT

A data center can share processing resources using virtual networks. A virtual machine manager (10) hosts one or more virtual machines (11, 411), the virtual machines forming part of a segmented virtual network (34). Outgoing messages from the virtual machines have an intermediate destination address of an intermediate node in a local segment of the segmented virtual network, and the virtual machine manager has a router (18) for determining a new intermediate destination address outside the local segment, for routing the given outgoing message. By having the router as part of the virtual machine manager rather than having only a switch in the virtual machine manager, the need for virtual machines for implementing gateways is avoided. This can reduce the number of "hops" for the message between virtual entities hosted, and thus improve performance. This can help a service provider to share physical processing resources of a data center between different clients having their own virtual networks.

18 Claims, 13 Drawing Sheets

VMS ONLY SEE EACH OTHER ON THE SAME SUBNET, COMMUNICATION WITH OTHER SUBNETS APPEARS TO THEM AS IF GOING THROUGH A GATEWAY - IF INTER-SUBNET COMMUNICATION IS ALLOWED

TRAFFIC ONLY ALLOWED AFTER MUTUAL AGREEMENT!

ROUTING ACROSS A VIRTUAL NETWORK

CLAIM FOR PRIORITY

This application claims the benefit of priority under 35 U.S.C. §119 to United Kingdom Patent Application No. 0804253.3, filed on Mar. 7, 2008, the disclosure of which is hereby incorporated by reference in its entirety.

RELATED APPLICATIONS

This application relates to commonly assigned and copending U.S. patent application Ser. No. 12/400,526 entitled "DISTRIBUTED NETWORK CONNECTION POLICY MANAGEMENT" and U.S. patent application Ser. No. 12/400,510 entitled "VIRTUAL MACHINE LIVENESS CHECK", filed on even date herewith, and hereby incorporated by reference in their entirety.

FIELD OF THE INVENTION

The invention relates to virtual machine managers for hosting virtual machines forming a segmented virtual network, and having a router to route messages from the virtual machines, and to corresponding networks, data centers, methods and software.

BACKGROUND

In most physical information technology (IT) infrastructure, resource utilization is very low: 15% is not an uncommon utilization for a server, 5% for a desktop. It is known to try to address this by sharing a physical machine between different users. Typically in a utility data center there may be hundreds of machines networked and shared by many enterprises. Each enterprise may be running many applications to serve their own customers. Known operating systems can be used to time share the physical processing resources of the machines between the different enterprises. Various ways are known to abstract or hide the underlying physical resources from the applications run by the enterprises. Overlay networks are known and make it easy to change the network configuration, abstracting devices from the configuration of the real network.

Storage virtualisation is also known. There are many commercial storage virtualization products on the market from HP, IBM, EMC and others. These products are focused on managing the storage available to physical machines and increasing the utilization of storage.

Virtual machine technology is a known mechanism to run operating system instances on one physical machine independently of other operating system instances. It is known to have a single physical hosting machine running two or more virtual machines connected by a virtual network on this machine.

A virtual machine (VM) is a self-contained operating environment that emulates a hardware platform. It can run a "guest" operating system. A real operating system called a virtual machine manager (VMM) is run on the physical hardware platform. The VMM runs one or more VMs and can contain multiple virtual devices, one of which can be a virtual network interface card (VNIC). VMware is a known example of virtual machine technology, and can provide isolated environments for different operating system instances running on the same physical machine.

An example of a virtual network interface is described in "SoftUDC: A Software-Based Data Center for Utility Computing", Kallahalla et al, Computer, November 2004, p 38-46.

Virtual machines access networking via a virtual network interface (VIF), which mimics an Ethernet device. A virtual machine manager (VMM) forwards outbound network packets to its physical network interface and dispatches incoming network packets to appropriate VIFs. The VMM encapsulates the packet and sends it to another VMM or a virtual router on the same VNET. The receiving VMM unwraps the packet and delivers it to the target VM.

Network traffic from virtual machines is distributed to virtual interfaces via Ethernet bridging in a special virtual machine containing a kernel module. The kernel module uses the EtherIP protocol to encapsulate outbound Ethernet traffic destined for a VNET in an IP packet and forwards the packet to the network. The kernel module decapsulates inbound EtherIP traffic to produce an Ethernet frame, which it delivers to VIFs on its VNET. An EtherIP header field stores a packet's VNET identification for transport across the network.

If a VIF requires direct access to the physical network, the kernel module delivers its traffic to the network without encapsulation. Ethernet frames are encapsulated rather than IP traffic primarily because doing so allows virtual machines to use any network protocol transparently. In addition, handling the Ethernet frame is simpler than extracting an IP packet.

The kernel module must direct encapsulated VNET traffic to a suitable internet protocol (IP) address. This care-of address is based on the Ethernet frame and VNET destination media access control (MAC) address. If the MAC is a broadcast or multicast address, the care-of address is the local VNET multicast address. If the MAC is a unicast address, the care-of address is the real IP address of the machine hosting the addressed VIF.

A Virtual Address Resolution Protocol (VARP) is used to discover VIF care-of addresses, which can change during virtual machine migration. Broadcasting a VARP reply for all VIFs maintains network connectivity by updating the VARP caches of any systems communicating with the virtual machine.

US patent application 2004/0267866 shows a virtual machine sending an IP datagram to an IP destination address. A virtual machine manager in the form of a base portion for hosting many virtual machines has a virtual network interface manager which determines if the target IP address is associated with one of the other virtual machines hosted by the base portion. If so, a virtual switch is used to switch the IP datagram to the appropriate virtual network interface for that virtual machine. Otherwise, a virtual switch manager is used to pass the datagram for transmission over an external local area network (LAN).

In "Towards Automated Provisioning of Secure Virtualized Networks", by Cabuk et al, November 2007, it is explained that a VMM can be hosted directly on the computer hardware (e.g., Xen) or within a host operating system (e.g., VMware). Today's virtual network implementations for VMMs are usually virtual switches or bridges that connect the virtual network cards of all VMs to the actual physical network card of the physical machine. All VMs can potentially see all traffic; hence, no isolation or other security guarantees can be given. While that level of security may be sufficient for individual and small enterprise purposes, it is certainly not sufficient for larger-scale, security-critical operations. This document proposes security-enhanced network virtualization, which (1) allows groups of related VMs running on separate physical machines to be connected together as though they were on their own separate network fabric, and (2) enforces cross-group security requirements such as isolation, confidentiality, integrity, and information flow control.

Related VMs (e.g., VMs belonging to the same customer in a data center) distributed across several physical machines, are grouped into virtual enclave networks, so that each group of VMs has the same protection as if the VMs were hosted on a separate physical LAN. If some VMs in a group are co-hosted on the same hardware; it is not necessary to involve the physical network during information flow between two such VMs.

A secure network virtualization framework helps realize the abstraction of Trusted Virtual Domains (TVDs) by guaranteeing reliable isolation and flow control between domain boundaries. The framework is based on existing and well-established network virtualization technologies such as Ethernet encapsulation, VLAN tagging, and virtual private networks (VPNs).

BRIEF DESCRIPTION OF THE FIGURES

Specific embodiments of the invention will now be described, by way of example, to show how they may be implemented, with reference to the accompanying figures, in which.

DESCRIPTION OF SPECIFIC EMBODIMENTS

Figure 1:
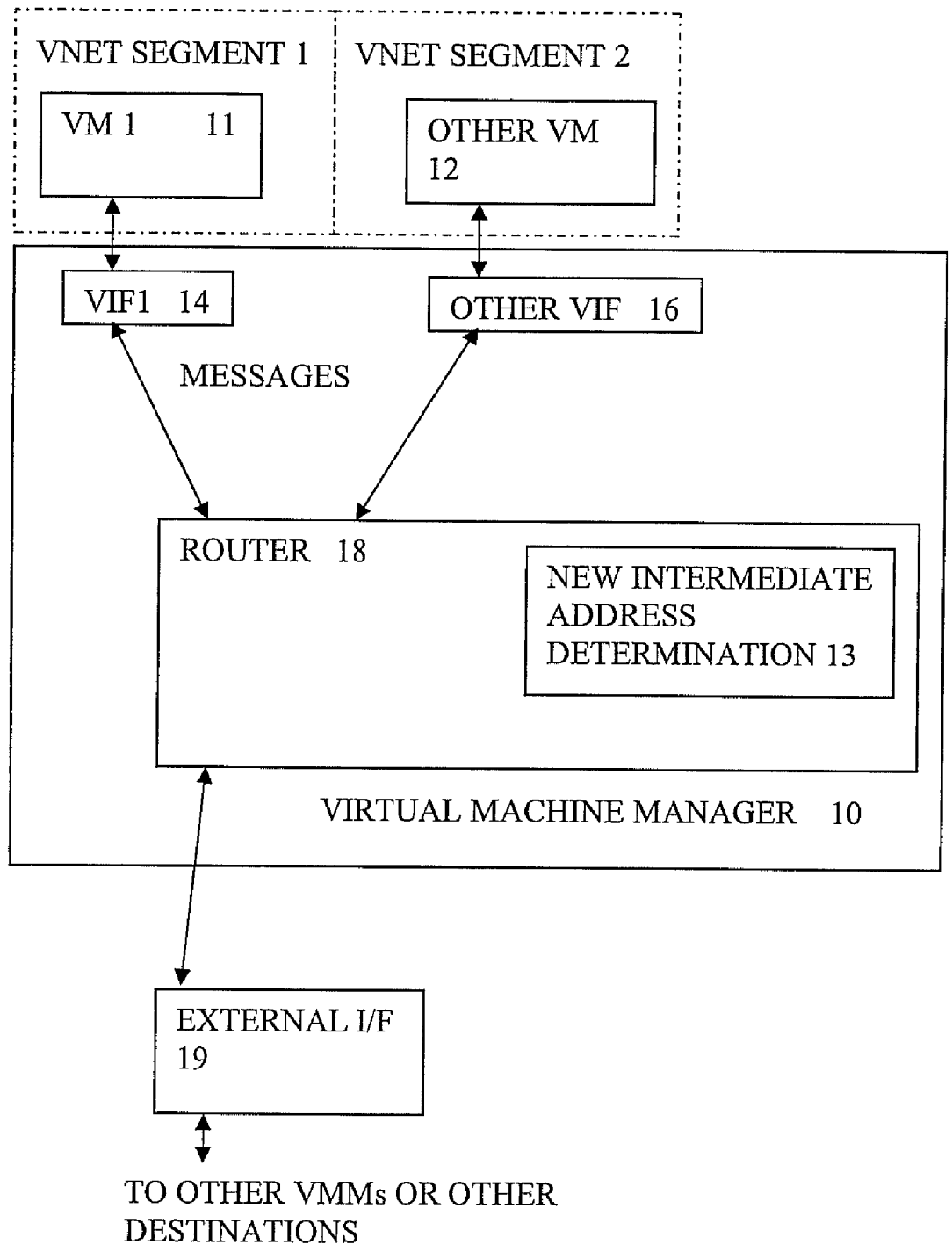
FIG. 1 shows an embodiment showing a virtual machine manager according to an embodiment.

Embodiments described below show how the claimed invention can be implemented in various forms such as virtual machine managers, physical machines for running virtual machine manager software, networks of such machines, methods and software. Any additional features can be added to the features claimed, without departing from the scope of the claims. Some such additional features are set out in dependent claims, and some are shown in the embodiments of the invention described in more detail below. The methods of use aspects are useful to get direct infringement or inducing of direct infringement in cases where the system is largely located outside the jurisdiction, as is feasible with many such systems, yet the user is using the system and gaining the benefit, from within the jurisdiction. Some advantages are explained below, other advantages may be apparent to those skilled in the art, particularly over other prior art than that known to the inventors. Any of the additional features can be combined together, and combined with any of the aspects, as would be apparent to those skilled in the art. The embodiments are examples only, the scope is not limited by these examples, and many other examples can be conceived within the scope of the claims.

Definitions

Data center is intended to encompass one or more computing machines grouped together at a single location whether for use by a single organisation or for sharing by many customers of a service provider organisation.

The term "virtual" usually means the opposite of real or physical, and is used where there is a level of indirection, or some mediation between a resource user and a physical resource. "virtual entity" can encompass for example a virtual machine, a group of virtual machines, a virtual storage element, a virtual interface card, a virtual look up table, and so on, usually implemented as software to emulate a corresponding physical entity.

"Virtual machine" (VM) encompasses a system that emulates in software an entity such as a physical computer, or any processing entity, including entities for carrying out specific functions such as router firewall, gateway and so on, which can generate or make use of messages. Ideally, programs run by the virtual machine should have no way of determining whether they are running atop a virtual machine or a physical machine. Note, in current practice, sometimes programs are aware they're running in virtual machines so that they can optimize for it. A VM can have one or multiple virtual interfaces, for example in different segments of a segmented virtual network.

"Virtual machine manager" encompasses any entity which hosts virtual entities such as virtual machines and can be implemented in the form of software such as an operating system for execution by hardware such as a physical host machine having a general purpose processor, or can be a system comprising such software and hardware, or can be dedicated firmware or hardware or any combination or hybrid of these for example. It is conceivable for some of the functions of the virtual machine manager to be implemented by a privileged virtual entity, hosted by an underlying hypervisor or virtual machine monitor.

"virtual machine monitor" is a component used in some implementations of a virtual machine manager, for hosting of VMs and switching of packets to the appropriate VM, without higher level processing such as routing. It can be the lowest level component of the virtual machine manager, and is sometimes called a hypervisor.

"virtual network" means a network of virtual entities each having their own address so that messages can be passed between them. It may be segmented with virtual gateways to couple different segments. There may be multiple virtual networks in a data center.

"Physical host machine" can encompass any type of processing machine, an example is a server having processing, storage and networking functions. A host can have multiple physical network interfaces for example to provide redundancy or to provide more bandwidth.

"Message" can encompass any sort of packet, cell, frame and so on in any format, with or without a header, of fixed or variable length, with an associated destination address which may be incorporated in the packet, cell or frame, or stored elsewhere.

"Intermediate destination address" can mean a link layer address such as a MAC (media access control) address or other type of address, and can be intermediate in the sense of denoting any point in the virtual or physical network or in communication stacks, passed by the message before reaching the final destination of the message.

"Final destination address" can mean a network layer address such as an IP address, or other address which is either the final destination of the message, or where the message leaves the physical network or virtual network for another network having another addressing scheme.

"farm" means the set of virtual entities owned, operated or controlled by a customer. Each farm can be a virtual network, or there can be multiple farms in a virtual network. Each farm may have one or more subnets.

Introduction to the Described Embodiments

In some of the embodiments described, there is a virtual network of virtual machines, hosted by a physical network of physical host machines hosting the virtual machines. Each of the physical host machines has a VMM arranged to handle packets sent from one virtual machine to another in the virtual network. This operating system would conventionally be arranged to switch such packets to a virtual machine which functions as a centralised virtual gateway of the virtual network. This conventional virtual gateway would have a routing table having a mapping of which virtual machines are hosted by which of the physical machines. It would also pass packets on to another virtual router, if the virtual network were a segmented virtual network, with a virtual gateway at an interface between each segment. Each virtual gateway may alter an intermediate destination address of a packet, to correspond to the virtual address of the next virtual router, but leaves the final destination address of the destination virtual machine, unaltered. This approach means that packets between VMs in separate subnets would require a minimum of 2 network hops (and 1 traversal of a routing VM) and packets between VMs in separate farms would require a minimum of 3 networks hops (and 2 traversals of routing VMs).

Figure 2:
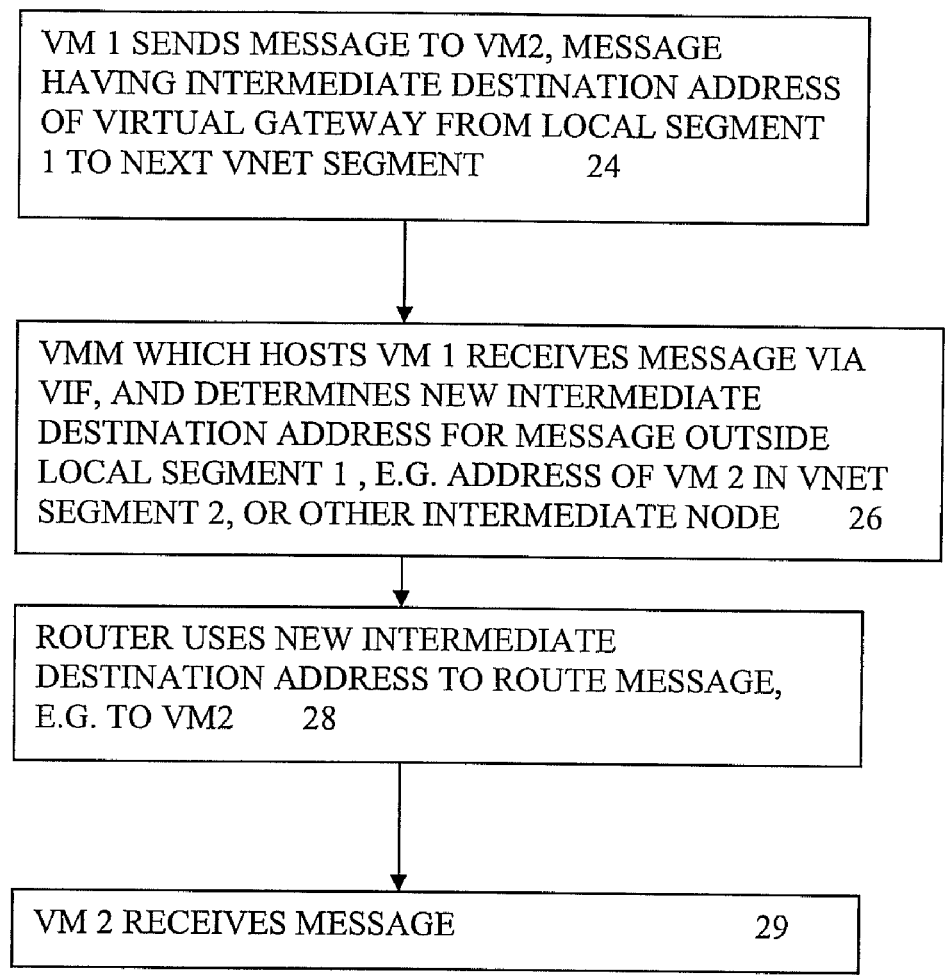
FIG. 2 shows steps in the operation of the embodiment of FIG. 1.

FIGS. 1, 2 Virtual Machine Manager (VMM)

In contrast to this conventional approach, embodiments of the invention have a routing function carried out by the virtual machine manager rather than only a switching function. Some embodiments relate to a virtual machine manager, the virtual machine manager being arranged to host one or more virtual machines, the virtual machines forming part of a segmented virtual network, the virtual machine manager being arranged to receive outgoing messages from the virtual machines, at least a given one of the outgoing messages having a part allocated for an intermediate destination address of an intermediate node in a local segment of the segmented virtual network, the node being suitable for passing the given message on towards a destination node in another of the segments, the virtual machine manager having a router for determining a new intermediate destination address outside the local segment, and for routing the given outgoing message according to the new intermediate destination address.

By having the router as part of the virtual machine manager rather than having only a switch in the virtual machine manager the need for virtual gateways is avoided, and the steps involved in transferring the message to and from such virtual gateways can be avoided. This can reduce the number of "hops" for the message between virtual entities hosted. Hence messages can be processed more quickly or more messages can be processed, than if a virtual machine router were used. Particularly in cases where most of the messages are likely to use the virtual gateway to reach other segments, and where there is a high ratio of communications load to processing load, then the overall performance increase can be considerable. Furthermore, by having the router in the virtual machine manager, the manager can now control the routing of the message. A number of possible advantages can arise. For example, such control can also be used to route messages via particular segments or virtual machines for monitoring, or for other purposes, or to avoid particular entities for any reason, such as for security reasons, or for load sharing, or to enable shut down for maintenance, or for other purposes. This can help a service provider to share physical processing resources between different clients having their own virtual networks for example, more efficiently or transparently. The source virtual machine or the destination need not necessarily be aware of any change in routing.

FIG. 1 shows a schematic view of a virtual machine manager (VMM) 10, showing some of the principal features, of course other features may be added. A router 18 is shown having ports to receive or send messages to or from virtual machines VM1 11, and other VM 12, hosted by the VMM. Virtual interfaces VIF1 14 and other VIF 16 are shown for passing the messages to or from the virtual machines. The VMs are shown in different segments 1 and 2 of a virtual network VNET. Of course there can be many more segments not shown. The router 18 has another port to an external interface 19 leading to other VMMs or other destinations such as physical entities or gateways to external networks for example. The router is able to route messages by deciding which is the appropriate port on which to send them out, according to their intended destination. The router helps define the segments of the virtual network by means of intermediate addresses allocated to each virtual machine.

In each segment, each VM is aware of the intermediate addresses of other entities in that segment. But to send a message to an entity in another segment, a given VM is only aware of an address for a gateway from its local segment to that segment rather than being aware of the intermediate address of the destination itself. Hence the VM relies on the router to determine the correct intermediate address to enable messages to be sent to that destination in another segment. This means the router acts as a virtual gateway between segments. This enables the segments to be managed independently, and preserves some degree of isolation of segments from each other. A new intermediate address determination part 13 determines an address within the next segment, which therefore need not be known to the originator of the message. This part can be implemented in various ways, some examples are described below.

FIG. 2 shows steps carried out during the operation of the embodiment of FIG. 1. At step 24, VM1 sends a message to VM2, the message having an intermediate destination address in a local segment of the virtual network, VNET segment 1, the address indicating a virtual gateway to VNET segment 2 which is the segment having the destination VM2. At step 26, the VMM which hosts VM 1 receives the message via the VIF, and determines a new intermediate destination address for the message outside the local segment. This new intermediate address can be for example an address of VM2 in VNET segment 2. Or the new intermediate destination address could be of some other intermediate destination such as a VM used for monitoring traffic flows, which subsequently would pass the message on to VM2. The router uses the new intermediate destination address to route the message by determining which port to direct the message to. For example the message is sent to the port for VM2 based on the new intermediate destination address being for VM2, as shown at step 28. At step 29, VM2 receives the message. This has all been achieved in a single hop without needing a first hop to a virtual gateway, and a second hop from the virtual gateway to the destination.

FIGS. 3-6 Network Views

Figure 3:
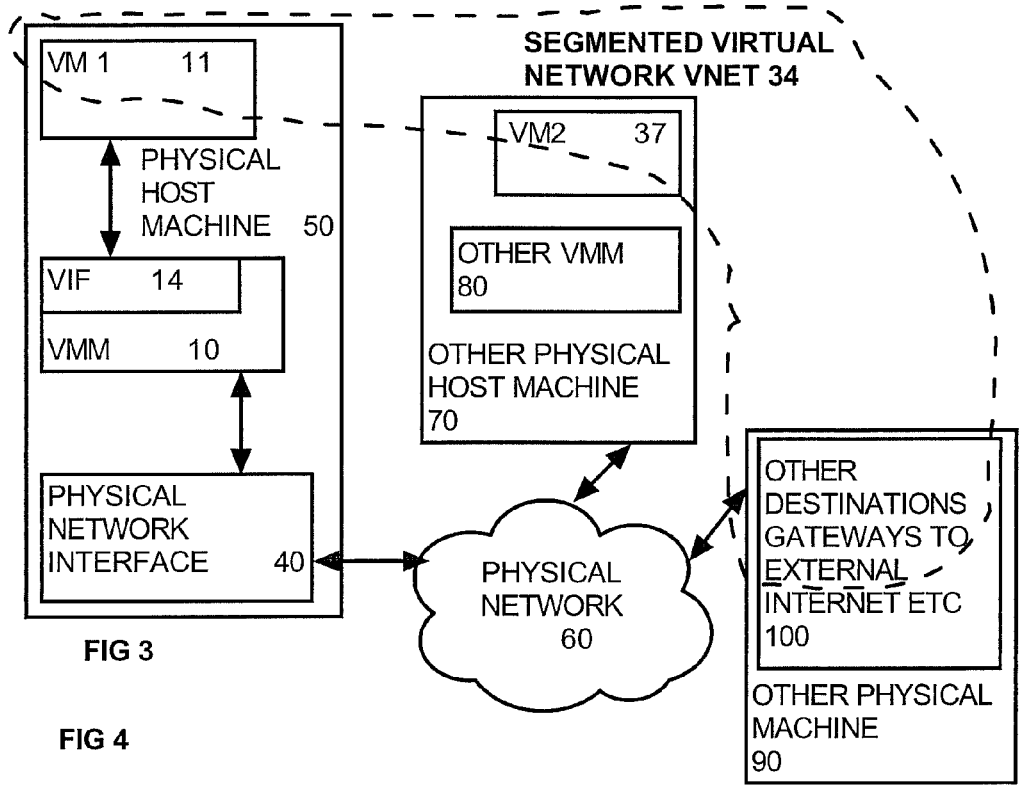
FIG. 3 shows another embodiment showing multiple virtual machine managers VMMs coupled by a physical network.

In some embodiments, as for example shown in FIG. 3, the virtual machine manager has a physical network interface (40) to communicate with other entities over a physical communications network (60), to route messages to such other entities.

The other entities can comprise other virtual machine managers (80), and the VMM can be arranged to determine which of the other virtual machine managers to route the message to.

In such embodiments involving passing messages over the physical network, the performance increase from reduced hops can be more pronounced. FIG. 3 shows the VMM 10 in the form of software run by a physical host machine 50. VM2 37 is shown hosted by another physical host machine 70. Also shown are other destinations, gateways to external networks such as the internet and so on, 100, hosted on another physical machine 90. This means that applications run by the VMs can provide services to users over the internet such as web based services of any type. The segmented virtual network VNET 34 can include VM1, VM2 and the other destinations and gateways.

Figure 4:
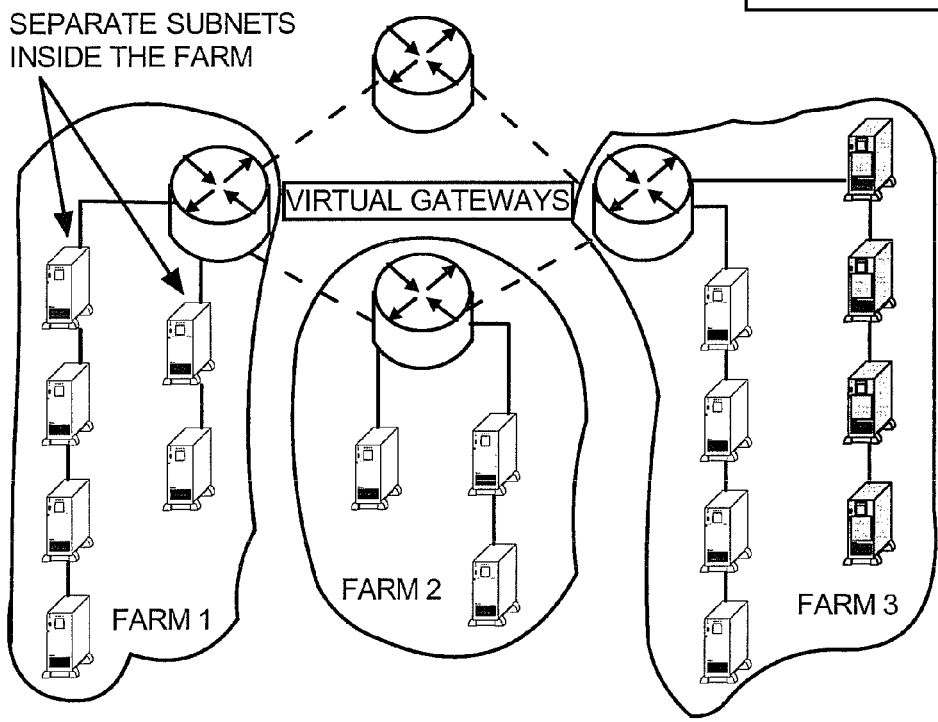
FIG. 4 shows an arrangement of a segmented virtual network which can be created using the VMMs of the embodiments described.

FIG. 4 shows an arrangement of a segmented virtual network which can be created using the VMMs of the embodiments described above for example. The virtual machines are grouped into farms, typically each farm can be for a different customer, or for different departments of a given organisation for example. Each farm is further divided into segments called subnets. Each subnet is coupled to other subnets in the same farm by a virtual gateway. Farms 1, 2 and 3 are shown, each having a virtual gateway with two subnets, though there can of course be many more subnets. Each virtual machine maintains the addresses of other virtual machines on its subnet, so that it can send messages to such other machines without restrictions or controls imposed by a virtual gateway. Optionally messages can be passed between farms by the virtual gateways, as will be discussed in more detail below with reference to FIG. 14. A fourth virtual gateway is shown not attached to a farm, which can be used for coupling to other destinations such as external networks.

The arrangement or topology of the virtual network can be completely independent of the topology of an underlying physical network. The topology of the subnets in an individual farm can be customer determined. The VMM or VMMs can provide a transparent virtual network layer which means that virtual machines do not need to know anything about the underlying physical network infrastructure (as for example that there is a single physical machine, or in another example, that there are many physical machines coupled by a completely switched physical network). Additionally, it is possible to configure VM-specific network policies on top of the virtual infrastructure, as will be explained below in more detail.

Figure 5:
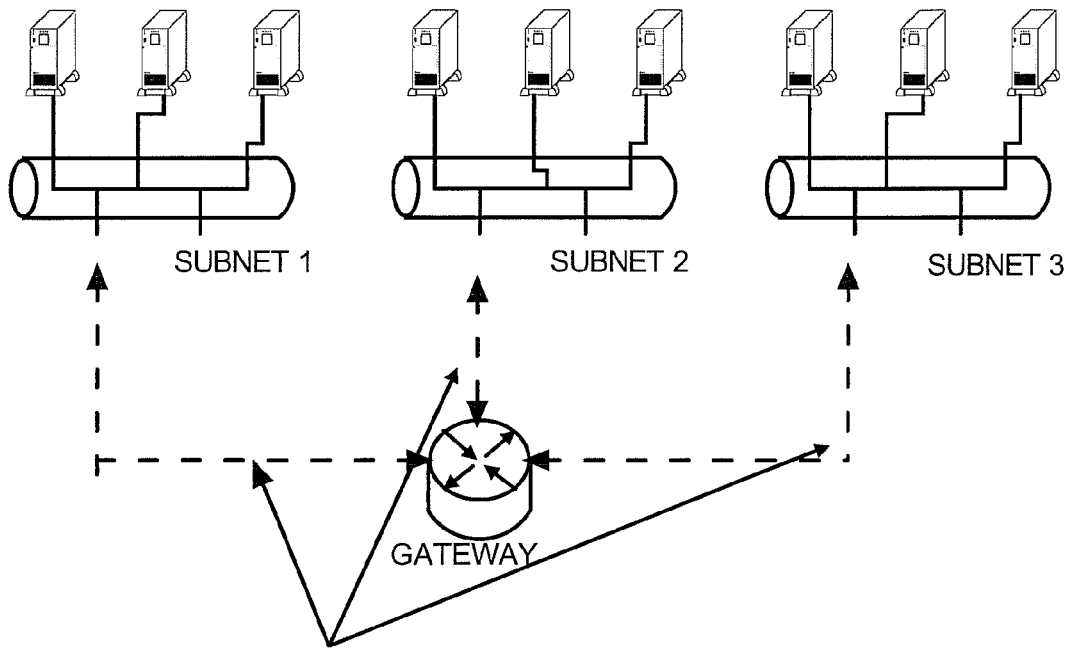
FIG. 5 shows another example of a topology of a segmented virtual network showing a single farm.

FIG. 5 shows another example of a topology of a segmented virtual network showing a single farm. In this case three subnets, each with three VMs. As in FIG. 4, each virtual machine maintains addresses of the other VMs, so they are aware of other VMs, typically all VMs on the same subnet, but are not aware of all VMs on other subnets. So if a VM on subnet 1 wants to send a message to another VM on a different subnet, the router implemented by the VMM will determine which subnet the destination VM is on and will pass the message onto that subnet.

Figure 6:
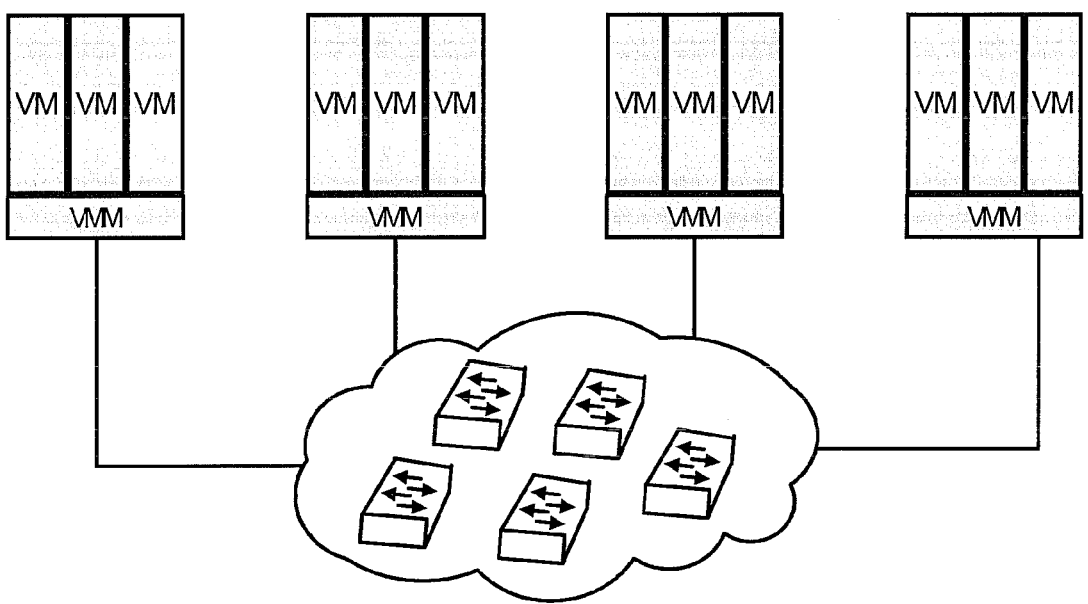
FIG. 6 shows a view of an arrangement of VMs hosted by VMMs coupled together by a physical network containing any arrangement of paths and switches.

FIG. 6 shows a view of an arrangement of VMs hosted by VMMs coupled together by a physical network containing any arrangement of paths and switches. This can be used to implement a segmented virtual network of arbitrary topology, such as those shown by FIGS. 4 and 5. Each VMM hosts a number or VMs. Each VMM is aware of all the others, and so can pass messages to them. Each VMM can find out which other VMM hosts a particular VM, or has a predetermined table of such locations. Such VMs can be moved to be hosted by another VMM, to improve load balancing for example.

Figure 7:
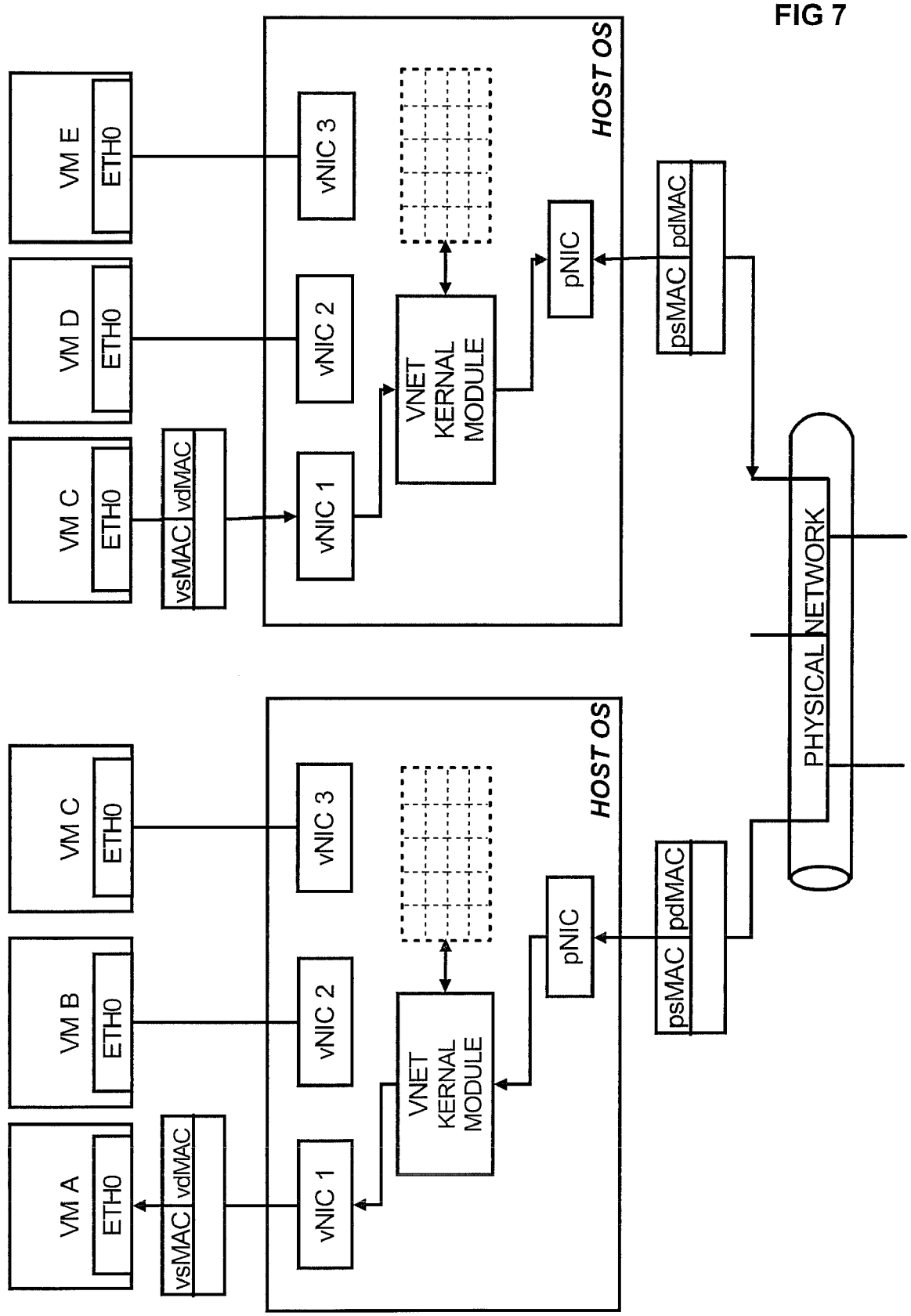
FIG. 7 shows two VMMs according to an embodiment, in the form of host OSs each hosting VMs, and showing a path of a packet.

FIG. 7 Router Using Address Rewrite

Another additional feature is the router being arranged to change the intermediate destination address of an outgoing message from a virtual network address to an address of a node in the physical network.

This enables the virtual network addresses to be kept independent of the physical network. This can enable switches on the physical network to be simpler, and makes it easier to handle large numbers of VMs.

Another such additional feature is the VMM being arranged to receive an incoming message from the physical network, and change the intermediate destination address of such an incoming message from a physical network address to a virtual network address. This helps preserve the illusion to the virtual machines that there were multiple hops, and that a virtual gateway was traversed.

The significance of not keeping intermediate addresses such as virtual MAC addresses when the messages are passed over the physical network will now be explained. If virtual MAC addresses were travelling on the physical wire, then the hardware switches of the physical network might have to maintain huge MAC address tables, if for example there is a requirement for support of up to 100000 virtual machines. Therefore MAC address rewriting is carried out by the VMM in the form of a host operating system (OS) for example and network traffic that is passed from one VMM to another can be messages in the form of Ethernet frames carrying only physical MAC addresses. Furthermore, if not using MAC rewriting capabilities, it would mean every host's physical network interface would need to be in promiscuous mode, so that it listens on all frames on the wire destined for one of its virtual machines. By using MAC rewriting promiscuous mode can be avoided which can result in better performance on the host OS.

Another additional feature of some embodiments is using part of the message to determine the new intermediate destination address. This part of the message can be for example a final destination address, to enable single hop routing, or can be other parts, such as an indication of a particular farm, a particular enterprise, a priority level of the message, to enable appropriate routing.

The messages can have a source address, and the router can be arranged to change the source address. This can help preserve the illusion of a conventional arrangement with a virtual gateway, which may help simulate behaviour of a segmented physical network and maintain existing security arrangements since VMS cannot see MAC addresses of VMs in other segments. Another such additional feature of some embodiments is the messages having a final destination address and the router being arranged to route the message based on the final destination address.

Another such additional feature is the message comprising a network layer destination address and the intermediate destination address comprising a link layer address.

For example the message may be in the form of an IP packet having an IP source and IP destination address. The new intermediate destination may be derived in that case from the IP destination address.

An example of one way of how to implement these features is to use the host OS to intercept packets, make use of a mapping between the different types (physical and virtual) of MAC addresses and do the MAC rewriting. FIG. 7 shows an example. This shows two VMMs in the form of host OSs each hosting two VMs. A physical network couples the host OSs. A path of a message in the form of a packet is shown by arrows. The packet is sent by VM C, to VM A. VM C passes the packet to its host OS via its emulated network card eth0 through which the packet appears on the virtual interface VIF 1 that resides in the host OS. A representation of the packet is shown to indicate that the packet has a virtual source MAC address (vsMAC) and a virtual destination MAC address (vdMAC). The virtual destination MAC address can be the address of a virtual gateway if VM A is on a different segment of the virtual network.

The VIF 1 passes the packet to the VMM in the form of a kernel module of the host OS. This carries out routing in the sense of determining where to send the packet based on a final destination, and carries out the rewrite of the MAC addresses to convert them to physical addresses according to a stored mapping of virtual to physical addresses. The packet is then output to the physical network via physical network interface card pNIC. A representation of the packet is shown to indicate that the packet has a physical source MAC address (psMAC) and a physical destination MAC address (pdMAC). These may be changed by the physical network if it is a routed network, or may remain the same if it is a switched network.

At the receiving side, the host OS receives the packet via a physical network interface card pNIC. The VNET kernel module carries out a conversion back to virtual MAC addresses based on a corresponding mapping. The kernel also carries out switching in the sense of determining which VIF to use to send the packet to the right destination VM. In this case it goes via VIF 1 to VM A. The representation of the packet at this point shows it has a virtual source MAC address (vsMAC) and a virtual destination MAC address (vdMAC). The vsMAC can indicate a MAC address of VM C if it is on the same segment, or may indicate the MAC address of the virtual gateway if on different segments.

In this way, communication between subnets appears to the VMs as if it is going through a virtual gateway. However, the functions described above of the kernel of the host OS just simulate a gateway; there is no actual virtual gateway. The rewriting of the source MAC address can create the illusion that a packet or frame has traversed the gateway. This "virtual" gateway is neither pingable nor traceable for virtual machines.

Figure 8:
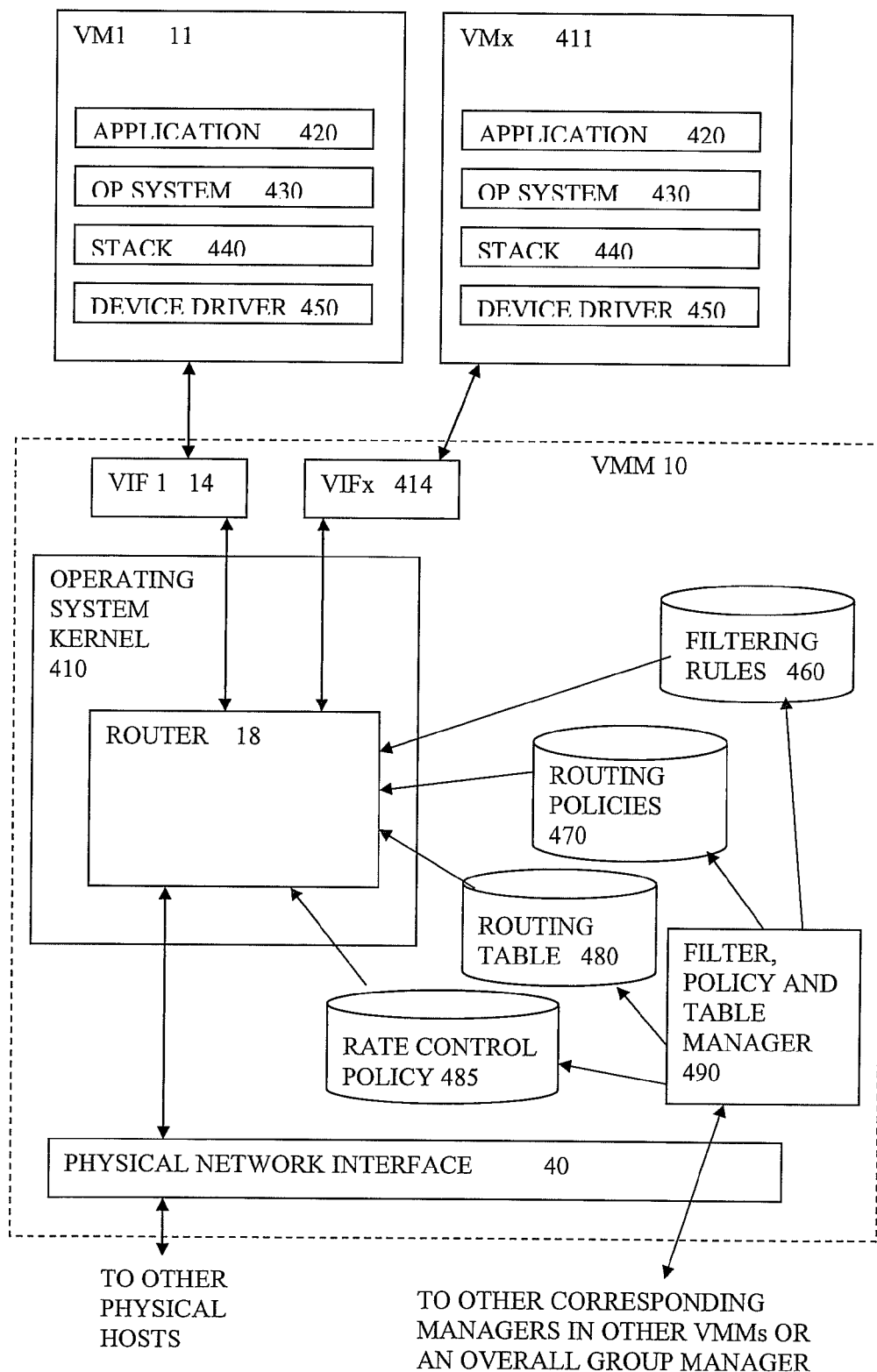
FIGS. 8 and 9 show alternative embodiments of a VMM having a router according to an embodiment.
Figure 9:
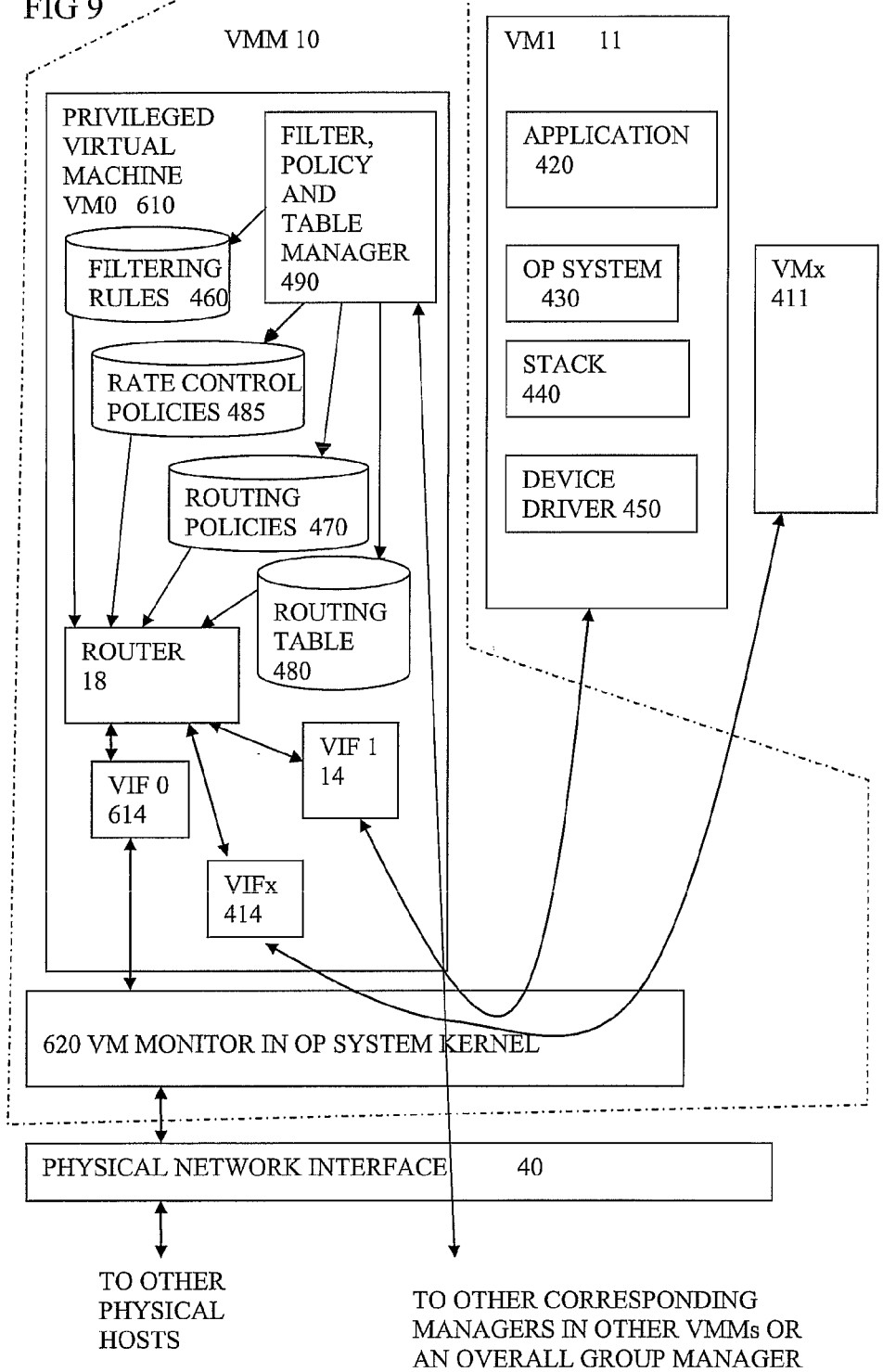
Figure 10:
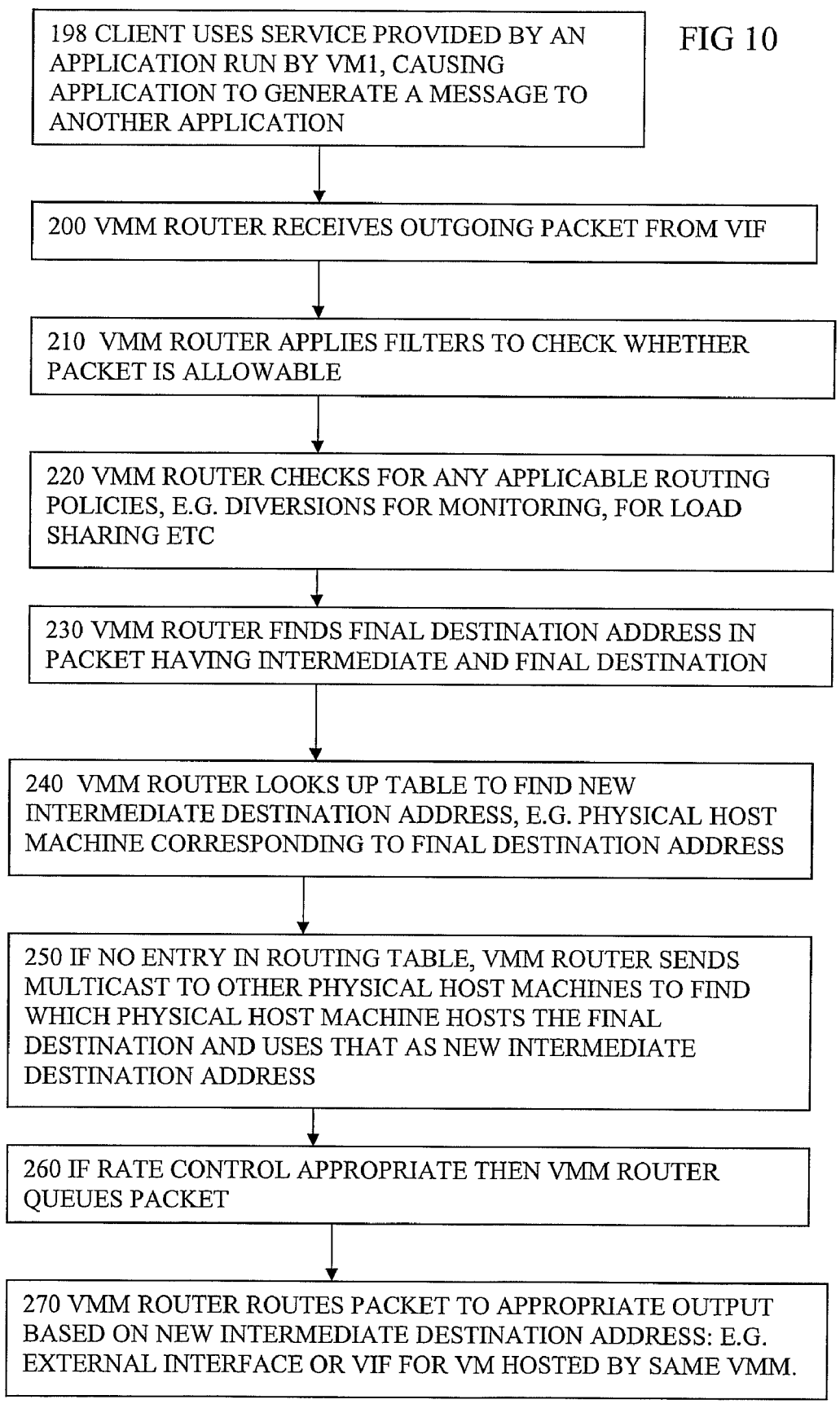
FIGS. 10, 11 and 12 show schematic views of operational steps of a router according to embodiments.

FIGS. 8 to 10, VMM Having Filtering, Routing Policies,

Another additional feature of some embodiments is the VMM having a message filtering part. The router can be arranged to filter according to stored filtering rules, to allow or not allow the message to pass, or to reroute the message based on the message rules. The filtering can for example provide visibility rules that isolate traffic between farms that share the same physical network. These can in some embodiments be enforced as mandatory filtering rules that all network traffic has to pass, making it impossible for virtual machines to violate these policies. In some cases, user definable filtering can be provided. Communication between farms for example can be made possible only if both sides have agreed to allow cross-farm network traffic to pass. In some embodiments the filtering can include VM specific filtering.

Another additional feature of some embodiments is the VMM having a routing policy part and the new intermediate destination address can be determined based on the routing policy part.

In some embodiments, the filtering and routing policies can be divided into two main parts that work on different logical layers and can be seen as being (at least logically) independent.

One part is responsible for providing the underlying infrastructure and offers a transparent virtual network for virtual machines. This includes providing basic visibility rules, routing etc. —which can be implemented at various layers, for example in the Ethernet layer in the host OS. These rules can be implemented by mandatory filters placed in the virtual infrastructure and can enforce network segmentation similar to usual hardware network devices like switches and router. Packet filtering rules will be configured using IP addresses based on a data center IP addressing scheme. All host systems will share the basic data center filtering rules, and will then derive additional rules for the IP addresses of the VMs they host.

The other main part can be VM-specific network filtering on top of this virtual infrastructure. These rules can be configured by the VM owner and will support IP-based firewalling capabilities. Rules can be applied as packets are received at network interfaces of the virtual machine, and can enforce mandatory packet filtering, which means that nothing inside the VM can bypass or modify these rules.

In some embodiments a rate control part can be provided. This is particularly useful to help insulate other farms from overloading on a given farm for example.

In some embodiments, the VMM is arranged to determine the new intermediate destination address by multicasting to at least some of the other VMMs to determine which of them hosts a destination entity of the given outgoing message.

Another such additional feature is the network hosting multiple virtual networks, and the multicasting being limited to those physical machines hosting entities of the same virtual network as the virtual network of the final destination address of the message.

FIG. 8 shows an example of an internal arrangement of a VMM to show one way of implementing some of these features in a VMM in the form of a physical host OS. FIG. 9 shows an alternative implementation having similar features but implemented in a privileged VM.

In FIG. 8, the VMM 10 has a VIF 1, 14 for VM 1, VIFx 414 for VMx, and so on. A router 18 is implemented in an operating system kernel 410, and handles packets from the VMs. It is coupled to physical networking interface 40 to reach other physical hosts. The VMM also has a store of filtering rules 460, a store of routing policies 470, a store of rate control policies 485 and a routing table 480. These are managed by a filter, policy and table manager 490. This part can be coupled to other corresponding managers in other VMMs, on other physical hosts, or may be coupled to a central or overall group manager. This could be owned and operated by a data center operator so as to ensure resources are shared effectively and without overloads on one user impacting other user.

Each of the VMs typically has a device driver 450, a stack 440, and an operating system 430. One or more applications 420 are run by the operating system. Some of the messages will be generated by the applications, but they can also be generated by the operating system.

FIG. 9 shows similar functions which are denoted by the same reference numerals where appropriate. Instead of the router being in the operating system kernel, many of the functions are instead placed in a separate distinct virtual machine VM0 610 which is privileged, meaning it is allowed direct access to the physical network, whereas other virtual machines have access controlled by filters and so on as described.

The underlying virtual machine monitor 620 can be a cut down operating system kernel which multiplexes VM0 and the other VMs to share the physical resources but has only basic multiplexing functions without higher level processing functions such as routing and filtering, and can be called a hypervisor.

As shown, the VIFs to VM1 and VMx are located in the privileged VM0. So any messages from VM1 or VMx are passed by the VM monitor directly to the corresponding VIF in VM0. From there they pass to the router 18. Incoming messages for these VMs are passed from the router to the corresponding VIFs and then via the VM monitor to the corresponding VM.

FIG. 10 shows an embodiment in the form of an example of some of the principal operating steps for the VMM of either FIG. 8 or FIG. 9, or other embodiments.

At step 198, a client uses a service provided by an application run by VM1, which causes the application to generate a message to send to another application. At step 200, the router of the VMM receives an outgoing packet from a VIF corresponding to VM1. At step 210 the VMM router applies filters to check whether the packet is allowable. At step 220, the VMM router checks for any applicable routing policies, e.g. diversions for monitoring, for load sharing etc. At step 230, the router finds a final destination address in a packet having intermediate and final destination addresses. The router looks up a table to find a new intermediate destination address, e.g. a physical host machine corresponding to a final destination address, at step 240. If no entry is found in the routing table, at step 250, the VMM router sends a multicast query to other physical host machines to find which physical host machine hosts the final destination and uses the address of that host as a new intermediate destination address. At step 260, if rate control is appropriate then the VMM router queues that packet. Rate control is not limited to queueing packets. It could for example be that the router is just classifying packets and tagging them accordingly, and some external component (for example a real network switch, or even a network card) is doing the actual queuing. At step 270, the VMM router routes the packet to an appropriate output based on the new intermediate destination address: e.g. to an external interface or to a VIF for a VM hosted by the same VMM.

Figure 11:
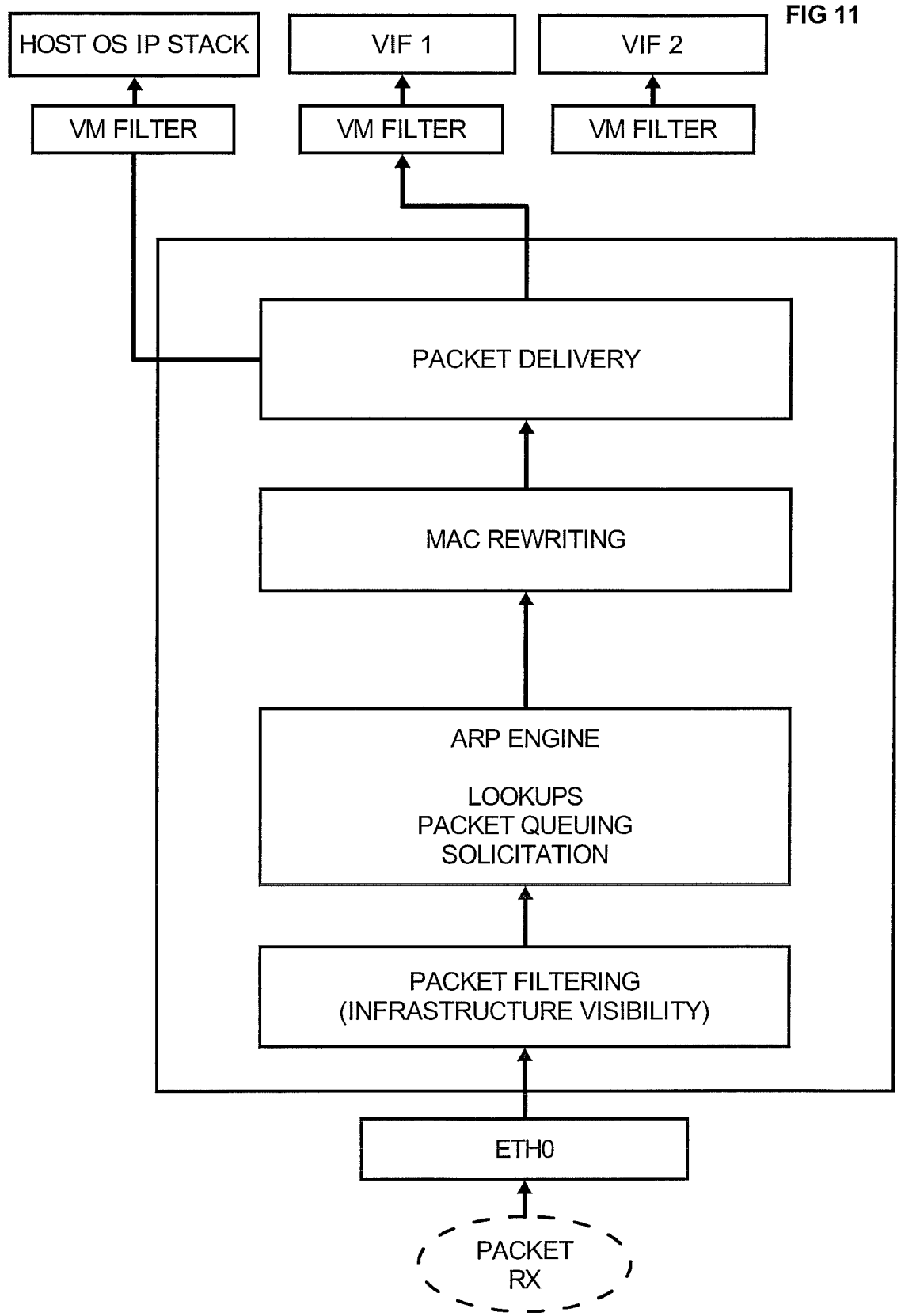
Figure 12:
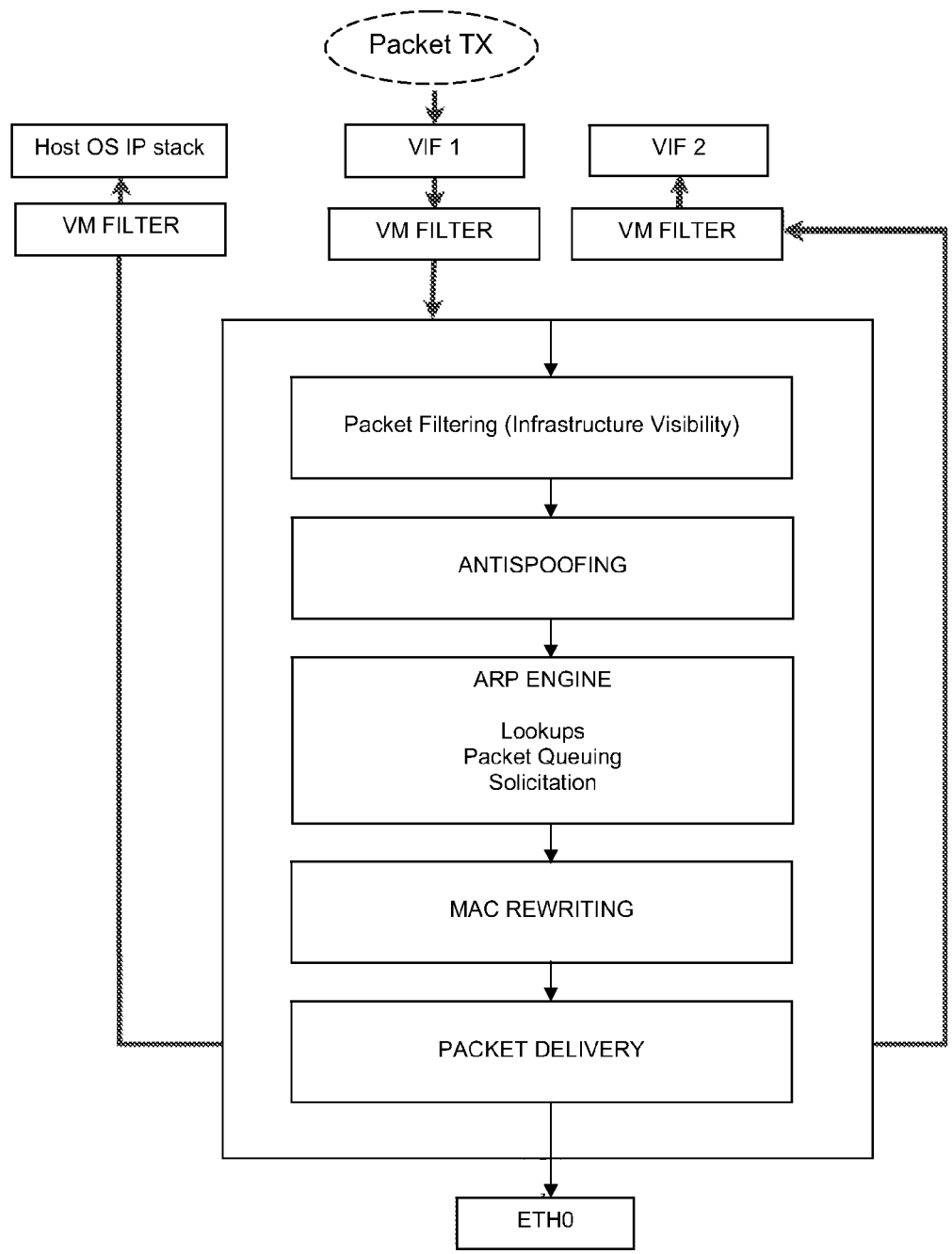

FIGS. 11 and 12 show sequences of some of the principal actions by the router according to embodiments. FIG. 11 shows an example of handling an incoming packet. FIG. 12 shows an example of, handling an outgoing packet. In FIG. 11, the VMM is implemented by a physical host running a Linux kernel module (VNET module) that intercepts and processes packets between virtual and physical machines of a data center. A basic packet flow involves a packet being received by physical network interface and passed to a packet filtering stage. If this is passed, it is followed by an ARP (address resolution protocol) engine stage to determine the new intermediate address.

In the filter stage, packets have to pass infrastructure rules which are IP based in this example. The filter throws away everything that violates any data center network filtering rules. If the packet passes all these checks then it is handled by the ARP engine. Here the VNET module code determines the new source and destination MAC addresses.

There are essentially three possibilities for the new source address:

a) If the destination is in the same segment as the source, then the source need to be changed from the address of the sending physical host into the address of the sending virtual machine.

b) If the destination is in a different segment, then the source need to be changed from address of the sending physical host into the address of the virtual gateway.

c) If the source address is unknown then the ARP engine sends a "backwards"

ARP to the sending physical host to explicitly ask for the source address that has been lost during the rewriting process on the sending host.

The new destination address can be found again in essentially four ways.

The destination address is looked up in the switching table.

a) If there is an entry found and the destination is a virtual machine on that host, then the destination is changed from the address of the physical host to the address of the destination virtual machine.

b) If there is an entry found and the destination is the host itself, then the address need not to be replaced.

c) If there is no entry found then the packet is dropped.

d) If the destination address is a broadcast or multicast address then there is no need for a lookup in the switching table, but instead the destination address can be determined through a predefined mapping.

Once the new addresses are determined, the packet can be passed to the MAC rewriting part. Once that is done, the frame is delivered either to one of the virtual network interfaces or passed up the network stack if the packet is destined for the host OS. If packet forwarding is desirable, then a third delivery option would be to send out the packet to the physical wire.

On each virtual network interface—as well as before passing a frame to the host OS—the VNET module filters traffic which is set up for each interface individually. This allows users to configure VM-specific network rules. MAC rewriting should also be done if a packet comes in destined for the host OS, as it might be coming from a specific VM and should then have the MAC address of the virtual gateway set as source address.

Frames that come out of a virtual machine are handled in more or less the same way, as shown in FIG. 12. At first a filter checks that infrastructure filtering rules are passed, and if the packet passes these checks, an anti spoofing check is carried out, to ensure that the source address is valid. This can involve checking valid source MAC and IP addresses for example. Then in the ARP engine stage, the destination IP address is checked as in FIG. 11 and the packet handled accordingly.

There are essentially three possibilities for the new source address:

a) If the destination is in the same segment and on the same host as the source, then the source need not be changed, to reflect the fact that there is no need to pass through a virtual gateway.

b) If the destination is in a different segment, but hosted by the same host as the source, then the message is not passed over the physical network and so there is no need to use physical network addresses, but the source should be changed to the address of the virtual gateway.

c) If the destination is hosted by a different host, the message will go over the physical network, as shown in FIG. 7, and the source address should be changed to a source address in the physical network.

The new destination address can be found again in essentially three ways.

a) If the destination is hosted by the same host, then by looking up the destination IP addresses in a switching table, a matching MAC address will often be found, which can be used as the new intermediate destination address for the message.

b) If no match, it queues the packet and an ARP can be sent out to all the hosted VMs to find if any are hosting the destination IP address, and it issues an ARP request to search the network for the appropriate host. If a host for the destination is found, it will have an address on the physical network such as a MAC address, which can become the new destination MAC address.

c) If the packet is a multicast or broadcast packet then the new destination address can be the appropriate subnet or farm multicast address.

One difference here is that these frames are now allowed to go on the physical wire, because the destination might reside on a different physical machine. Packets can also be passed up the host OS IP stack if they are destined for the host OS itself. This of course only happens if the VM is allowed to talk to the host OS, for example to enable the host OS to handle farm controllers used to allocate physical resources may be implemented in a VM and need to manage storage resources to allocate them to other VMs.

Figure 13:
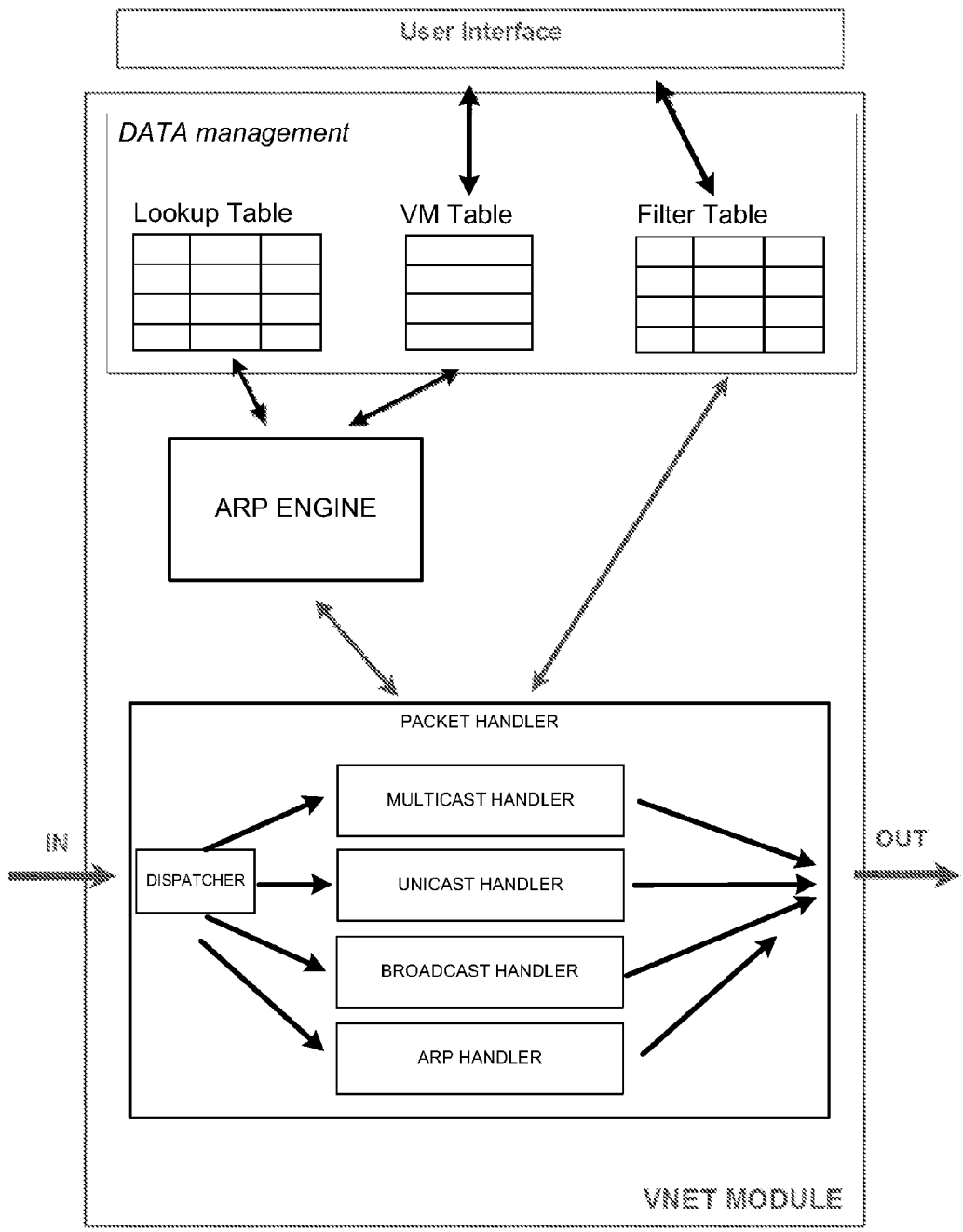
FIG. 13 shows an internal arrangement of a router in the form of a VNET module for a VMM, according to an embodiment.

FIG. 13, Determining New Intermediate Address by ARP

The use of a virtual networking approach provides a virtual network infrastructure that has a topology completely independent of that of the physical network. Virtual machines do not (need to) know anything about the underlying physical network, because the underlying networking capabilities provide a completely transparent virtual environment. One important aspect of this approach is that physical hosts know where to find virtual machines in the network, and what MAC addresses they have to place in the frames that are passed to a VM. Therefore a solicitation mechanism is provided between all hosts that helps to discover and advertise virtual-IP-to-virtual-MAC bindings or mappings. These mechanisms are based on an ARP type scheme, and for that purpose each host runs an ARP engine. The ARP engine can operate independently and invisibly to the usual Linux ARP mechanisms of both the host OS and all virtual machines on the system. As shown in FIG. 13, the ARP engine is coupled to a packet handler, and to a look up table and to a VM table in this example, though of course other arrangements can be used. These items will each be explained in turn.

Packet Handler:

The packet handler receives and manages all traffic: ARP+IP, from VMs and from the physical network. It connects to the ARP engine for handling of ARP traffic ("arp handler" box within the packet handler) and for discovery of unresolved addresses. The boxes "multicast handler" "broadcast handler" and "unicast handler" are for handling non-ARP packets (both incoming and outgoing). Each can be implemented with the functions explained in FIGS. 8 to 12, the multicast and broadcast handlers being arranged to deliver packets to multiple destinations.

Look-Up Table and VM Table

The ARP engine can manage a global look-up table that contains entries that help finding the virtual MAC address for a given virtual IP address, and the physical MAC address of the host on which this virtual IP currently resides. This global switching table is the main base for look-ups, and is supposed to be kept up-to-date by issuing periodical re-ARPs and setting timeouts on all non-fixed entries. The look up table also contains information about local interfaces, keeping a binding for each virtual IP address that belongs to one of the local virtual machines.

Also shown in FIG. 13 is a VM table which stores attributes or characteristics of each VM. The ARP engine issues regular liveness checks to all its local VMs, and updates the VM table and the look-up table accordingly to ensure that they are always up-to-date. There will be different indexes to access the look-up table to enable quick searches. Using this mechanism it is possible to find entries for local virtual machines in a large table very quickly—without running over all entries of remote machines.

Entries for fixed IP addresses of local VMs need not have any timers associated—they are inserted when a VM comes up and removed when a VM shuts down. All other entries (for all remote IP addresses) have two timers attached: one triggers a periodical re-ARP mechanism to check on the availability of the IP address and the other checks whether the IP address is actually used by someone. The re-ARP process runs continuously, even when there is no reply for an ARP request. However, the other timer that checks the usage of an IP address causes the re-ARP process to stop sending ARP request messages, if an IP address is not used any more. In that case the ARP engine removes all timers on the entry and so freezes all solicitation mechanisms for that entry. However, the entry is not removed from the look-up table, and in case someone starts using that IP again, new timers will be set up and solicitation is reactivated. Of course this means that after a while there may be many frozen and unused entries in the look-up table. To ensure that the tables not extended to infinity, a memory usage limit is set on the table.

The ARP engine manages several packet queues.

Local ARP Requests Queue:

One queue keeps track of all pending ARP requests coming from a local VM. If the VM issues an ARP request and there is a match for that virtual IP address in the switching table, then it can immediately reply to that ARP request without any queuing at all. If there is no match, then an ARP request for that virtual IP address is sent onto the physical wire, if there is no other pending ARP request for that specific IP. This queue is indexed by the virtual IP address, and each entry keeps a reference to the actual VM that is waiting for that ARP reply. This ensures that when an ARP response is received, the ARP engine can just go through the list of waiting VMs and send ARP replies to their interfaces immediately. All entries of the queue keep timers, and when they run out, the entry is just removed.

Remote ARP Requests Queue:

If an ARP request is received from a remote host, in most cases a reply can be sent after looking up the IP address in the switching table without any queuing.

Local Outgoing Data Packet Queue

This queue contains all data packets that have been sent out by a locally hosted virtual machine, but not yet sent out on the wire, because there is no match for the destination virtual IP in the look-up table. Timers are placed on each entry in the queue, and packets dropped after a specific time; otherwise the queue will become too big.

Incoming Data Packet Queue

Incoming data packets are queued while doing "backwards" ARP to resolve the virtual source IP address. All queue entries are associated with a timer, and if a timeout occurs, the packet is dropped. Note that "backwards" ARP is the only situation in which actual data packets are queued, as it should never happen that an incoming data packet has an unknown destination MAC address, since the sending host should have resolved this before sending.

Fair packet queuing techniques can be used to avoid using too much memory. If too many packets are queued, new incoming packets will simply be dropped. Queue buffers are based on the VM that the packets are queued for—both for inbound packets waiting to be passed into a VM and outbound packets coming out of a specific VM. This ensures that if a huge amount of packets comes in for a specific VM while waiting for an IP to be resolved, it does not affect waiting packets for other virtual machines. This significant mechanism helps ensure that appropriate isolation for virtual network traffic is in place. Other ways of per-VM or per-subnet, or per-farm memory utilization limiting can be used to prevent one VM or subnet or farm from denying service to others.

Multicast packets cannot be associated with only one specific VM, but should be accounted to the queue buffers of all VM's that are part of that multicast group.

"Backwards" ARP

During the MAC rewriting process on the source host the virtual source MAC address is replaced with the MAC of the physical host. When the frame arrives on the destination, the kernel module has to reverse the process and place the virtual source MAC address back into the frame before passing it to the VM. However, it might be that there is no match in the look-up table for that IP address and the host OS does not know what MAC address to put in there. So the ARP engine issues an ARP request directly to the source host OS to explicitly ask about the virtual MAC belonging to the virtual IP. Because this is a unicast request, it does not produce too much network traffic, and the hosts should learn bindings quickly and not have to use backwards ARP too often.

In FIG. 13, a "user interface" is shown, with access to the VM table and the Filter table. This is a low-level interface meaning it would be accessible only to someone having access to that particular physical box (meaning the data center manager). Because this VNET module is a critical component that affects the whole data center networking, "direct" access is only permitted to privileged management.

On top of that interface there are more layers of configuration for virtual networks. Some of those higher-level interfaces are only accessible for a data center manager (e.g. mandatory filtering and routing policies that affect the whole infrastructure), but other interfaces are accessible for users/customers, too (like e.g. filtering/routing policies that only affect a specific user's/customer's resources).

To summarise the ARP as described, it can determine the new intermediate destination address, to determine virtual network MAC addresses for messages arriving from the physical network, and physical network MAC address mappings, for messages going in the other direction to the physical network. A modified ARP can be used that does unicast ARP before broadcast ARP to prevent unnecessary multicast traffic. A local DHCP response can be used to provide a VM with its IP address. A modified ARP can be used to allow rapid dissemination of changed IP->MAC bindings. One ARP table shared by all VMs can help to limit an amount of network multicasts. Support for non-"IPtables" filtering can be provided through the inclusion of customer-created routing elements.

Figure 14:
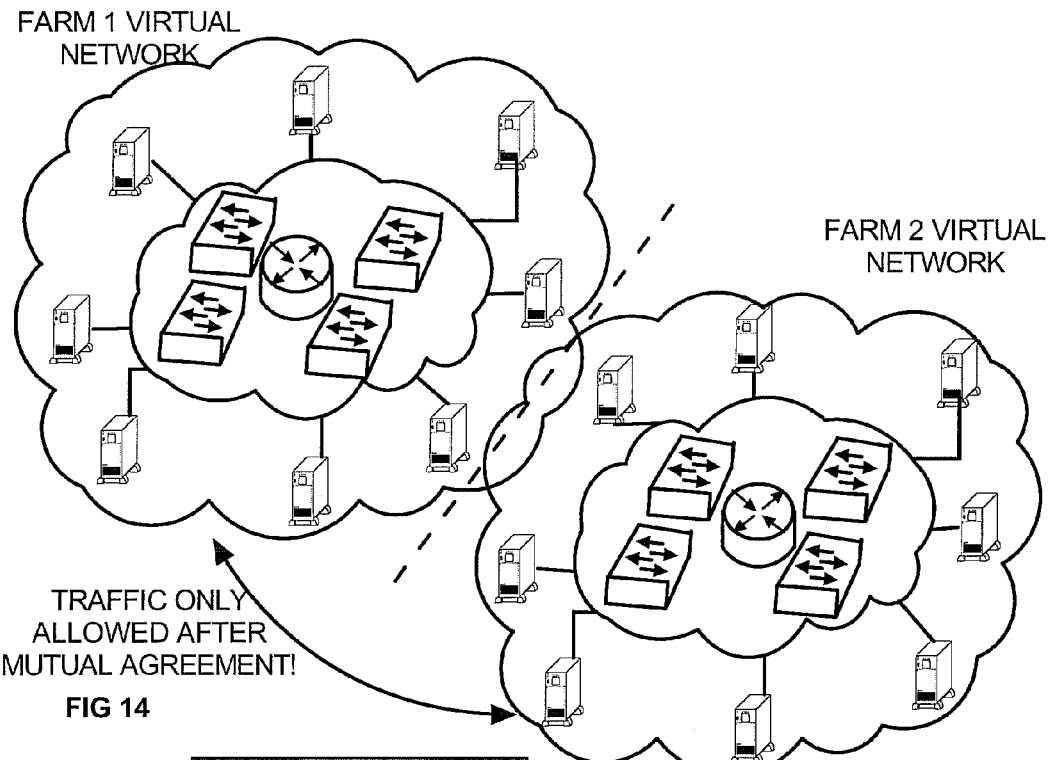
FIG. 14 shows an arrangement of virtual network farms.
Figure 15:
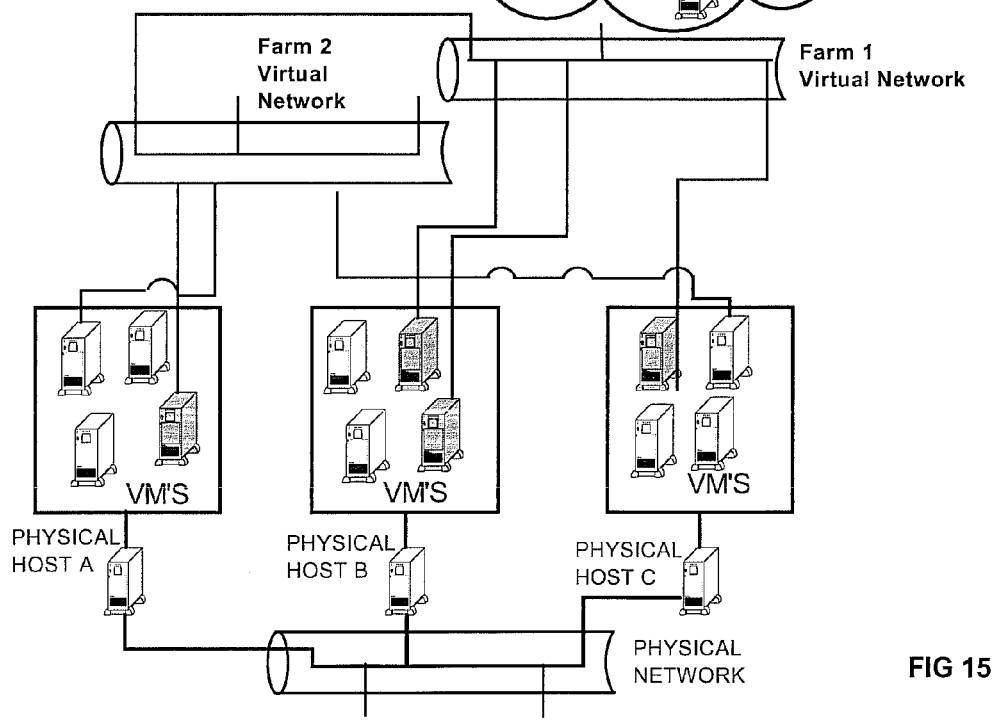
FIG. 15 shows a view of an example showing several virtual network farms and a physical network.
Figure 16:
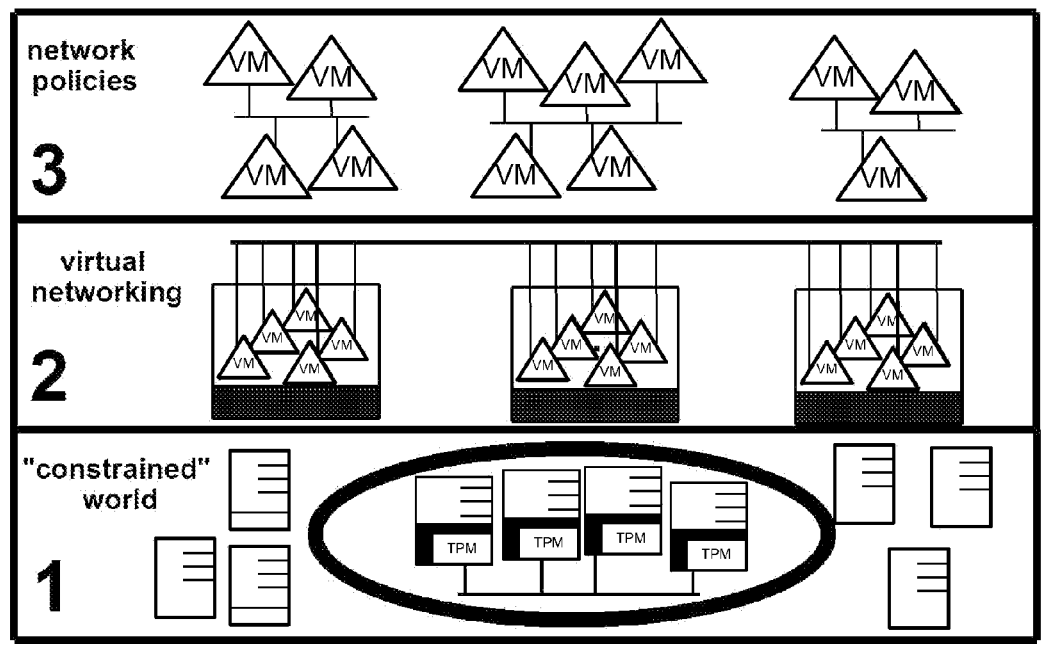
FIG. 16 shows schematically a three layer model of an embodiment.

FIGS. 14 to 16

FIG. 14 shows an example of a pair of virtual networks each forming a farm having a number of segments coupled by virtual gateways. Traffic between the two farms is allowed only if both sides agree. This is can be achieved using the embodiments described above. FIG. 15 shows an example of a number of virtual networks in the form of farms having a number of virtual machines hosted on a number of physical hosts, A, B and C in this case. As can be seen, farm 1 has virtual machines on hosts A, B and C, and farm 2 has virtual machines on hosts A and C. Of course other arrangements can be envisaged.

For some messages, the determined next address can be a final destination in the network, and the routing can be directly to that final destination. Sending directly is intended to mean there is only one hop in the network (though in some cases the final address in the network can be a gateway to an external network such as the Internet, implying there can be further hops in the external network). This helps minimise hops and avoids the use of intermediate virtual entities such as centralised virtual gateways. Sending directly in one hop can encompass sending over more than one link at layer two, the link layer of the physical network, for example via switches which switch the message onto a next link according to the next address and do not alter the next address.

The secure virtual networking can allow single-hop communication even between distinct farms. Receive-side MAC address rewriting can be used to maintain an illusion to the virtual machines, of separate farms/subnets separated by virtual machine routers. Transmit-side MAC rewriting into per-farm link-layer addresses can avoid address range limitations and maintain farm isolation.

Transmit-side unicast MAC rewriting can help prevent pollution of switch forwarding tables with virtual MAC addresses. Deterministic IP->MAC mapping can be used, and can avoid the need for reverse lookup on packet receipt. Content encapsulation can be used to allow content protection and host<->host authentication on the physical network. Integration with widely used 'iptables' packet filtering software can be used to perform packet-filtering at the router.

Some embodiments involve a network having multiple interconnected physical host machines, multiple virtual machines hosted by the physical host machines, and two or more of the physical host machines being arranged as a distributed router to carry out routing of messages to or from the virtual machines.

Another such additional feature is the router being aware of substantially all the hosts in the physical network for all the virtual machines hosted by the hosts, and being arranged to determine a destination amongst these (the other physical machines,) or the physical host machine, for messages from the one or more virtual machines, and capable of rewriting link layer addresses of the messages.

If encapsulation and IP-level discovery are provided, then the messages can be passed over a non-flat (ie routed) physical network. Source and destination based routing in the virtual networking layer can allow the use of customer specified routing elements.

As described above, at least some of the embodiments can be applied in a virtual machine data-centre to be able to securely separate and isolate each customers' farm of virtual machines to provide the illusion of dedicated compute, storage and network resources. Ideally, customer farms should also be allowed to implement and selectively expose services to other farms and consume services provided by other farms, to allow a rich ecosystem of interacting services to develop. To this end, support for efficient, secure virtual networking is important.

As described, some embodiments allow virtual machines within customer farms and virtual machines in distinct customer farms to exchange packets directly (ie with only a single network 'hop') without compromising farm integrity. Some embodiments also allow packets to be exchanged between VMs without encapsulating the packet in any manner, thus preserving normal MTUs for packets. Having the routing carried out by the VMM means that the single network hop can be implemented without needing to program network switches, assuming a flat (ie switched) underlying physical network.

The underlying physical network can be a completely switched network and in some cases can provide a "closed world" network. However, certain virtual machines may be allowed to communicate with external systems by means of a real NAT (network address translation) gateway that translates external IP addresses into data center allocated IP addresses which can be seen by the rest of the network as an "OUTSIDE" farm.

This makes use of having a fully virtualized infrastructure: network traffic to and from virtual machines from within the host OS is controlled. This approach can provide stronger security, and also allows enhanced overall network performance for a data center. Completely local traffic flow between virtual machines on one physical host is allowed, even if the VMs are on separate virtual subnets. Additionally, some specific virtual machines may be allowed to talk to the host OS directly. Mechanisms that make it possible to locally reply on ARP or DHCP requests coming from virtual machines can be provided. This can result in less network traffic on the physical wire and better performance. A transparent virtual network layer means that virtual machines need not know anything about the underlying physical network infrastructure (as for example that it can be a completely switched network). Additionally, it will be possible to configure VM-specific network policies on top of the virtual infrastructure.

Visibility rules that isolate traffic between farms that share the same physical network can be provided. These can be enforced as mandatory filtering rules that ALL network traffic has to pass, making it impossible for virtual machines to violate these policies. Communication between farms is only possible if both sides have agreed to allow cross-farm network traffic to pass. In the same manner network separation inside a farm, based on subnets can be enforced. These can be configured by the farm owner, but per default, virtual machines can only see each other if they reside on the same subnet. Communication between subnets appears to the VMs as if it is going through a gateway.

FIG. 16 shows a schematic view having three layers. In a shared data center network there has to be a feasible way of guaranteeing that only machines in a known, good state can access a secure, trusted network, and that no other machines can interfere with the system. On top of this, different (potentially competing) parties owning VMs within the virtualized infrastructure need dedicated, isolated virtual network resources while running over this shared, underlying physical network. The embodiments described can provide a way to validate network policies automatically to provide assurance about a system's global state from a networking point of view—which may be required to fulfill certain Service Level Agreements (SLAs).

The three layers illustrated are a physical layer having a number of constraints, a virtual networking layer and a top layer of network policies. The first layer shows a physical network having a number of servers coupled by a network. The second layer shows a number of virtual machines hosted on each host, and coupled together on subnets to form a farm. The third level shows groups of virtual machines each isolated from other groups according to the policies.

(1) On the physical network level the known 802.1X network access control standard can be used provided for example by Hewlett Packard ProCurve switches; additionally, known trusted computing technologies can to ensure that all physical machines are in a known good state. A single, trusted VLAN can be provisioned on all infrastructure switches. Access to this VLAN is only granted after a successful authentication using 802.1X. Machines that wish to be part of this trusted infrastructure are provisioned with a cryptographic key for the 802.1X authentication. However, this key is "sealed" to a specific, trusted platform configuration (the Trusted Computing Base or TCB) through a secure provisioning process and protected by a Trusted Platform Module (TPM) on that machine. Sealing ensures that the TPM will only release this secret (the network authentication key) if the platform is running a valid, attested TCB, and only then will the host be granted access to the secure VLAN. Through this mechanism a secure, "constrained world" network can be provided in which all machines can be trusted. As an alternative to the 802.1X solution, an approach in which communication between trusted machines is encrypted (or at least authenticated) can be provided and therefore protected from interference from untrusted machines that are hosted within the same physical infrastructure. In this scenario a gatekeeper component can be provided to which new nodes have to authenticate and prove that they run an attested TCB (again using Trusted Computing technologies) before they are provisioned with the network authentication key, so that they can participate in the secure communication.

(2) On top of this trusted infrastructure the secure network virtualization can be provided that is easy to manage and validate. Virtualisation based on layer 3 (network-level) information can provide the illusion of farms consisting of several subnets. For example the virtual IP address space is segmented by assigning IP addresses of the format 10.<FARM>.<SUBNET>.<HOST> to VMs. By default, VMs inside a subnet can communicate with each other without any restrictions, but communication between VMs of different subnets has to be explicitly allowed by the farm owner. Communication across two different farms is only permitted if both sides have mutually agreed on such a communication. At the core of the network is a notional gateway connecting all the subnets within a farm. The gateway mediates all inter-subnet communications within the farm and inter-farm communications across multiple farms. Its actual functionality is contained in the routers distributed amongst all the physical machines hosting VMs within the farm, as described above.

Where the underlying physical infrastructure is a fully switched network, distributed routers in VMMs can quickly discover the location of (virtual) IP addresses and pass packets directly to the destination machine without needing hops to virtual gateways. This can have a notable performance impact, especially for inter-farm communication. By operating on layer 3 network level information, the need for deploying and configuring routing entities (like routing VMs) can be avoided which is an important advantage in terms of manageability. Also, managing MAC addresses of many thousands of VMs is a significant burden for physical switches within virtualized infrastructures. By using address rewrite, no MAC addresses of VMs appear on the physical wire, which provides the illusion of virtual gateways and limits broadcast and multicast traffic.

(3) At the highest layer shown in FIG. 16, this approach facilitates a distributed network policy management framework. A packet filtering component is embedded in all physical machines and enforces mandatory policies that cannot be bypassed by any VM. By allocating VM IP addresses using a meaningful abstraction (10.<F>.<S>.<H> or simply <F:S:H>) and constructing policies using global conventions (e.g., <0:0:*> is the management subnet or S=15 is the public subnet), compact, symbolic rules that define routing between farms and subnets can be expressed. These generic rules can be parameterized on the end-points when a VM is created and be translated into local packet filtering rules (using IPTables for example).

Implementation:

The applications run by the data centers can include any type of software including computer-aided design (CAD), database, web page server, and other types. The virtual machines can be implemented using any conventional programming language, including languages such as C, and compiled following established practice. The servers and network elements can be implemented using conventional hardware with conventional processors. The processing elements need not be identical, but should be able to communicate with each other, e.g. by exchange of messages.

Other variations can be conceived within the scope of the claims.

What is claimed is:

1. A virtual machine manager to host one or more virtual machines that form part of a segmented virtual network and to receive outgoing messages from the one or more virtual machines, at least a given one of the outgoing messages having a part allocated for an intermediate destination address representing an intermediate node in a local segment of the segmented virtual network, the intermediate node being suitable for passing the given outgoing message on towards a destination node in another of the segments, the virtual machine manager comprising:
a router configured to determine a new intermediate destination address outside the local segment, and to route the given outgoing message according to the new intermediate destination address;
wherein the router is configured to change the intermediate destination address of the given outgoing message from an address in the virtual network to an address of a node in a physical communications network; and
wherein the virtual machine manager is configured to receive an incoming message from the physical communications network destined for one or more of the one or more hosted virtual machines, and wherein the router is configured to change an intermediate destination address of the incoming message from an address in the physical communications network to an address in the virtual network.

2. The virtual machine manager of claim 1, further comprising a physical network interface configured to communicate with other entities over the physical communications network, to route messages to the other entities.

3. The virtual machine manager of claim 2, wherein the other entities comprise other virtual machine managers, and wherein the virtual machine manager is configured to determine to which of the other virtual machine managers to route the given outgoing message.

4. The virtual machine manager of claim 1, wherein the outgoing messages comprise a source address, and wherein the router is configured to change the source address.

5. The virtual machine manager of claim 1, wherein the virtual machine manager is further configured to determine the new intermediate destination address from another part of the given outgoing message.

6. The virtual machine manager of claim 1, wherein the outgoing messages each comprises a final destination address and the router is configured to determine the new intermediate destination address based on the respective final destination address.

7. The virtual machine manager of claim 1, further comprising a message filtering part.

8. The virtual machine manager of claim 1, further comprising a routing policy part, the new intermediate destination address being determined based on the routing policy part.

9. The virtual machine manager of claim 1, further comprising a rate control part.

10. The virtual machine manager of claim 3, wherein the virtual machine manager is further configured to determine the new intermediate destination address by multicasting to at least some of the other virtual machine managers to determine which of the other virtual machine managers hosts a next destination entity of the given outgoing message.

11. The virtual machine manager of claim 10, wherein the virtual machines are grouped into farms, the virtual machine manager is configured to identify to which farm a destination of the given outgoing message belongs, and the multicasting is limited according to which other virtual machine managers host entities of the same farm.

12. The virtual machine manager of claim 1, wherein the outgoing messages comprise a network layer destination address and the intermediate destination address comprises a link layer address.

13. The virtual machine manager of claim 1, wherein the virtual machine manager is further configured to route the given outgoing message directly to a final destination in the virtual network if the determined new intermediate destination address corresponds to the final destination.

14. A method of operating a virtual machine manager to host one or more virtual machines, the one or more virtual machines forming part of a segmented virtual network, the method comprising:
using the virtual machine manager to receive outgoing messages from the one or more virtual machines, at least a given one of the outgoing messages having a part allocated for an intermediate destination address representing an intermediate node in a local segment of the segmented virtual network, the intermediate node being suitable for passing the given outgoing message on towards a destination node in another of the segments;
determining a new intermediate destination address outside the local segment;
routing the given outgoing message according to the new intermediate destination address;
changing the intermediate destination address of the given outgoing message from an address in the virtual network to an address of a node in a physical communications network;
receiving an incoming message from the physical communications network, destined for one or more of the one or more hosted virtual machines; and
changing an intermediate destination address of the incoming message from an address in the physical communications network to an address in the virtual network.

15. A computer readable non-transitory medium encoded with a program which when executed causes a virtual machine manager to operate according to the method set out in claim 14.

16. A data center having a number of virtual machine managers, wherein each virtual machine manager is configured to host one or more virtual machines, the one or more virtual machines forming part of a segmented virtual network and to receive outgoing messages from the one or more virtual machines, at least some of the outgoing messages having a part allocated for an intermediate destination address representing an intermediate node in a local segment of the segmented virtual network, the intermediate node being suitable for passing the given outgoing message on towards a destination node in another of the segments, the virtual machine manager having a router configured to determine a new intermediate destination address outside the local segment, and to route the given outgoing message according to the new intermediate destination address, the virtual machine managers each having a physical network interface configured to communicate with others of the virtual machine managers over a physical communications network, and to route messages to virtual machines hosted by the other virtual machine managers, wherein the router is configured to change the intermediate destination address of the given outgoing message from an address in the virtual network to an address of a node in the physical communications network, and wherein the virtual machine manager is configured to receive an incoming message from the physical communications network, destined for one or more of the hosted one or more virtual machines, and wherein the route is configured to change an intermediate destination address of the incoming message from an address in the physical communications network to an address in the virtual network.

17. A method of providing a service to a user, the service being run by one or more virtual machines in a data center, the data center having a number of virtual machine managers each hosting one or more of the virtual machines, the virtual machines forming part of a segmented virtual network, the virtual machine managers each having a router and a physical network interface to communicate with others of the virtual machine managers over a physical communications network, to route messages to virtual machines hosted by the other virtual machine managers, the method comprising:

receiving from a user remote from the data center, an input to the service, the input causing a given one of the virtual machines to send an outgoing message to another of the virtual machines, the outgoing message having a part allocated for an intermediate destination address representing an intermediate node in a local segment of the segmented virtual network, the intermediate node being suitable for passing the outgoing message on towards a destination node outside the local segment, and thus causing the router of the virtual machine manager to determine a new intermediate destination address outside the local segment, and to route the given outgoing message according to the new intermediate destination address;

generating a response by running the service, and sending the response to the user using one or more of the virtual machines running the service;

changing the intermediate destination address of the outgoing message from an address in the virtual network to an address of a node in the physical communications network;

receiving an incoming message from the physical communications network, destined for one or more of the one or more hosted virtual machines; and changing an intermediate destination address of the incoming message from an address in the physical communications network to an address in the virtual network.

18. A method of using a service run by one or more virtual machines in a data center the data center having a number of virtual machine managers each hosting one or more of the virtual machines, the virtual machines forming part of a segmented virtual network, the virtual machine managers each having a router and a physical network interface to communicate with others of the virtual machine managers over a physical communications network, to route messages to virtual machines hosted by the other virtual machine managers, the method comprising:

a user remote from the data center using the service by sending an input to the service which causes a given one of the virtual machines to send an outgoing message to another of the virtual machines, the outgoing message having a part allocated for an intermediate destination address representing an intermediate node in a local segment of the segmented virtual network, the intermediate node being suitable for passing the outgoing message on towards a destination node outside the local segment, and to cause the router of the virtual machine manager to determine a new intermediate destination address outside the local segment, and to route the given outgoing message according to the near intermediate destination address;

the user receiving a response generated by the service, the response having been sent to the user by one of the virtual machines running the service;

changing the intermediate destination address of the outgoing message from an address in the virtual network to an address of a node in the physical communications network;

receiving an incoming message from the physical communications network, destined for one or more of the one or more hosted virtual machines; and changing an intermediate destination address of the incoming message from an address in the physical communications network to an address in the virtual network.

* * * * *

UNITED STATES PATENT AND TRADEMARK OFFICE
CERTIFICATE OF CORRECTION

PATENT NO. : 8,370,834 B2  Page 1 of 1
APPLICATION NO. : 12/400491
DATED : February 5, 2013
INVENTOR(S) : Aled Edwards et al.

It is certified that error appears in the above-identified patent and that said Letters Patent is hereby corrected as shown below:

In the Claims:

In column 21, line 8, in Claim 16, delete "route" and insert -- router --, therefor.

In column 22, line 8, in Claim 18, delete "center" and insert -- center, --, therefor.

In column 22, line 29, in Claim 18, delete "near" and insert -- new --, therefor.

Signed and Sealed this
Twenty-first Day of May, 2013

Teresa Stanek Rea
*Acting Director of the United States Patent and Trademark Office*